(12) United States Patent
Tanaka et al.

(10) Patent No.: US 8,011,831 B2
(45) Date of Patent: Sep. 6, 2011

(54) ZIPPER TAPE, PACKING BAG WITH ZIPPER TAPE AND APPARATUS FOR PRODUCING PACKING BAG WITH ZIPPER TAPE

(75) Inventors: Kenichi Tanaka, Sodegaura (JP); Ryo Katada, Sodegaura (JP)

(73) Assignee: Idemitsu Unitech Co., Ltd., Tokyo (JP)

( * ) Notice: Subject to any disclaimer, the term of this patent is extended or adjusted under 35 U.S.C. 154(b) by 640 days.

(21) Appl. No.: 12/162,250

(22) PCT Filed: Jan. 26, 2007

(86) PCT No.: PCT/JP2007/051280
§ 371 (c)(1),
(2), (4) Date: Jul. 25, 2008

(87) PCT Pub. No.: WO2007/086513
PCT Pub. Date: Aug. 2, 2007

(65) Prior Publication Data
US 2009/0022435 A1    Jan. 22, 2009

(30) Foreign Application Priority Data

Jan. 27, 2006  (JP) ................. 2006-019812
Apr. 26, 2006  (JP) ................. 2006-122457

(51) Int. Cl.
  *B65D 33/00* (2006.01)
  *B65D 33/16* (2006.01)
  *A44B 19/00* (2006.01)
  *B31B 1/00* (2006.01)

(52) U.S. Cl. ... 383/210.1; 383/61.2; 383/63; 24/585.12; 493/394

(58) Field of Classification Search .......... 383/210–211, 383/203, 204, 61.2, 63; 24/399, 585.12; 493/394
See application file for complete search history.

(56) References Cited

U.S. PATENT DOCUMENTS
5,486,051 A    1/1996  May
(Continued)

FOREIGN PATENT DOCUMENTS
EP    1 418 131 A1    5/2004
(Continued)

OTHER PUBLICATIONS
Supplementary European Search Report of EP 07 70 7512 (Feb. 18, 2010).

*Primary Examiner* — Jes F Pascua
(74) *Attorney, Agent, or Firm* — Millen, White, Zelano & Branigan, P.C.

(57) ABSTRACT

A zipper tape includes a pair of a male member and a female member including engagement portions and belt-like bases, continued to the engagement portions. The belt-like base includes a seal base defined by widening the belt-like base a larger width from the engagement portions to a crosswise end of the belt-like base than that of the belt-like base. A bond layer and an easy-peel layer are layered on a surface of the seal base in side of the engagement portion and heat-fused to a bag body. The seal base is formed of polypropylene. The bond layer is formed of a mixture of polypropylene and low density polyethylene. The easy-peel layer is formed of a mixture of low density polyethylene and polypropylene. A ratio of polypropylene in the easy-peel layer is smaller than a ratio of polypropylene in the bond layer.

35 Claims, 23 Drawing Sheets

U.S. PATENT DOCUMENTS

| | | | |
|---|---|---|---|
| 5,538,345 A * | 7/1996 | Gotoh et al. | 383/210 |
| 5,733,636 A | 3/1998 | May | |
| 5,749,658 A * | 5/1998 | Kettner | 383/204 |
| 5,827,163 A * | 10/1998 | Kettner | 493/211 |
| 5,887,980 A | 3/1999 | May | |
| 2002/0100144 A1 | 8/2002 | Machacek et al. | |
| 2003/0022778 A1 | 1/2003 | Schneider | |
| 2004/0091186 A1 | 5/2004 | Shibata | |
| 2005/0286812 A1 | 12/2005 | Sprague et al. | |
| 2009/0238500 A1* | 9/2009 | Nanba et al. | 383/203 |
| 2010/0014787 A1* | 1/2010 | Katada et al. | 383/63 |
| 2010/0226599 A1* | 9/2010 | Katada et al. | 383/210 |
| 2010/0266224 A1* | 10/2010 | Nanba et al. | 383/204 |

FOREIGN PATENT DOCUMENTS

| | | |
|---|---|---|
| JP | 09-77096 A | 3/1997 |
| JP | 10-147352 A | 6/1998 |
| JP | 2002-284196 A | 10/2002 |
| JP | 2003-103660 A | 4/2003 |
| JP | 2004-106929 A | 4/2004 |
| JP | 2004-123187 A | 4/2004 |
| JP | 2004-168420 A | 6/2004 |
| JP | 2005-40630 A | 2/2005 |
| JP | 2005-342323 A | 12/2005 |
| WO | WO 2004/050487 A2 | 6/2004 |
| WO | WO 2006/041057 A1 | 4/2006 |

* cited by examiner

ZIPPER TAPE, PACKING BAG WITH ZIPPER TAPE AND APPARATUS FOR PRODUCING PACKING BAG WITH ZIPPER TAPE

TECHNICAL FIELD

The present invention relates to a reclosable zipper tape that is attached to a package bag or the like, a package bag having the zipper tape (hereafter abbreviated to "zipper-equipped bag"), and a manufacturing apparatus of the zipper-equipped bag. The present invention can be utilized, for example, in a zipper-equipped bag used to package a product consisting of solids and water, or in a zipper-equipped bag for packaging food to be retort processed.

BACKGROUND ART

A reclosable zipper-equipped bag having at an opening thereof an engageable belt-like zipper tape a pair of mating male and female members has been utilized as a packaging application for packaging a variety of goods such as food, drugs and other medical products, miscellaneous goods and the like. In a widely employed manufacturing method of the zipper-equipped bag whose opening is reclosable, a zipper tape is manufactured in advance before being heat-sealed on base films that form a bag body.

Before a user opens and recloses the zipper tape of the zipper-equipped bag, the zipper-equipped bag is in a closed state by a heat-seal at a periphery of the bag body (side seal) and a heat-seal near an opening end of the bag (top seal). When the zipper tape is opened to take out a product in the bag body, a portion near the opening end of the bag body including top seal has conventionally been cut and removed to allow the zipper tape to be opened so that the product can be taken out.

More often than not, the zipper-equipped bag having such an arrangement fails to achieve air-tightness or water-tightness. For example, when the zipper-equipped bag encapsulating a fluid product is transported, the product leaks through a tiny gap in the engaged portions of the zipper tape or through a boundary between a collapsed portion of the side seal and the engaged portions of the zipper tape toward the top seal.

Various attempts have been made to provide the zipper-equipped bag with air-tightness or water-tightness. For example, a zipper-equipped bag in which mating fastener tapes (zipper tapes) are bonded with each other at portions thereof adjacent to the product in an easily peelable manner via a hot-melt adhesive or the like is provided (e.g. see Patent Document 1).

Another package bag has been disclosed in, for example, Patent Document 2. A base portion of the zipper tape is wider than the other base portion. A sealant is provided on a portion of the first (wider) base portion adjacent to the engagement portion. When the bag is opened, a first flange on which the sealant is provided is separated from a second flange on which an engagement member is provided.

Still another package bag has been disclosed in, for example, Patent Document 3. The bag has a reclosable zipper tape. Prior to use, a dividing wall provided near a lower end of the zipper tape prevents a fluid from travelling toward the zipper tape. Upon use, the dividing wall can be easily peeled with the same force that opens and closes the zipper.

Patent Document 1: JP-A-2004-168420 (claim 1, FIG. 2)

Patent Document 2: International Publication 2004/050487 Pamphlet

Patent Document 3: JP-A-2005-40630

DISCLOSURE OF THE INVENTION

Problems to be Solved by the Invention

The package bag having the zipper tape (hereafter abbreviated to "zipper-equipped bag") disclosed in Patent Document 1 exhibits water-tightness. However, when pressure is applied to an interior of the package bag, such as a case of use for packaging retort food that is to undergo retort process at high temperature, the portion bonded in an easily peelable manner is easily peeled from the inside. Accordingly, sealing performance has been properly exhibited only under a condition where the internal pressure is not applied to the package bag.

In addition, according to Patent Document 2, since a resin forming the easy-peel portion (i.e. the first flange) that needs to be separated is not configured sufficiently user-friendly, an undesirably large force is required to open the bag, thereby causing inconvenience to users.

According to Patent Document 3, the dividing wall needs to include a large sealing portion to retain air-tightness, thereby setting a limit to dimensions of the bag. If the sealing portion of the dividing wall is small, pressure applied to the interior and the exterior of the bag easily peels the dividing wall. Thus, the sealing performance is exhibited only under limited conditions. The bag is not suitable for a package bag that needs to withstand internal pressure applied thereto in a heating process, a retort process, and the like.

An object of the present invention is to provide a zipper tape which allows easy unsealing of the easy-peel portion and to provide, employing the zipper tape, a zipper-equipped bag that provides air-tightness and water-tightness after encapsulation of a product, facilitates an unsealing operation, and offers an excellent package for retort food that undergoes retort process under high temperature.

Another object of the present invention is to provide a zipper-equipped bag and a manufacturing apparatus of the same, the zipper-equipped bag exhibiting sealing performance even when pressure is applied to the interior and the exterior thereof and allowing easy unsealing.

Means for Solving the Problems

A zipper tape according to an aspect of the present invention includes a male member including a first engagement portion and a first belt-like base continued to the first engagement portion and a female member including a second engagement portion and a second belt-like base continued to the second engagement portion, the first and the second engagement portions mating in a pair, in which one of the first and the second belt-like bases is widened from the mating first and second engagement portions to a crosswise end of the one of the first and the second belt-like bases relative to the other of the first and the second belt-like bases in order to define a seal base, a bond layer and an easy-peel layer bonded to the seal base via the bond layer are layered on a first surface of the seal base in side of the mating first and second engagement portions, the seal base is formed of polypropylene, the bond layer is formed of a mixture of polypropylene and low density polyethylene, the easy-peel layer is formed of a mixture of low density polyethylene and polypropylene, and a ratio of polypropylene in the easy-peel layer is less than a ratio of polypropylene in the bond layer.

Here and hereafter, the crosswise end of the belt-like portion indicates an edge of the belt-like base along an extending direction (continuing direction) of the engagement portion. Accordingly, a width from the engagement portion to a crosswise end of the belt-like base indicates a dimension in a direction perpendicular to an extending direction of the engagement portion.

For example, if the zipper tape is attached to inner surfaces of the films (bag body) that form the package bag, the crosswise end of the belt-like base is an end disposed between the engagement portion and the interior of the bag body (where a product is placed), and the width from the engagement portion to the crosswise end of the belt-like base is a dimension in a direction from the engagement portion toward the interior of the bag body.

According to the aspect of the present invention, the easy-peel layer is not directly bonded to the seal base, but is bonded thereto via the bond layer. Therefore, peel start point of the zipper tape attached to the inner surfaces of the package bag is advantageously stabilized. When the zipper tape not having the bond layer is opened, peeling of the easy-peel layer starts from various points, thereby causing the peeling operation to be unstable. In contrast, if the bond layer is provided as is in the present invention, the bonding force between the bond layer and the easy-peel layer may be appropriately determined so that the peeling occurs between the layers. Since the peel start point is thus stabilized, the user can stably and securely conduct an unsealing procedure of the package bag.

According to the aspect of the present invention, the seal base is formed of polypropylene; the easy-peel layer is formed of a mixture of low density polyethylene and polypropylene; and the bond layer that bonds the seal base to the easy-peel layer. Accordingly, the package bag and the easy-peel layer are securely bonded.

Since the easy-peel layer contains low density polyethylene, an appropriate peel strength is established as compared to, for example, a case in which the easy-peel layer formed of polypropylene adhesive or the like increases the peel strength to hinder peeling. Accordingly, peeling is facilitated.

In addition, the ratio of polypropylene in the easy-peel layer is smaller than the ratio of polypropylene in the bond layer. Accordingly, if the zipper tape is attached to the inner surfaces of the package bags, for example, the seal base and the easy-peel layer can be securely bonded, and at the same time, the easy-peel portion can be peeled from the inner surface of the package bag at a moderate peel strength.

Therefore, the package bag employing the zipper tape can improve the peeling feel and facilitate the opening procedure for users.

In the above arrangement, the easy-peel layer preferably is formed of a mixture of linear low density polyethylene and polypropylene.

The easy-peel layer may be formed of low density polyethylene. However, if the easy-peel layer is formed of linear low density polyethylene, the easy-peel portion can be peeled at an appropriate strength. Therefore, the package bag employing the zipper tape can improve the peeling feel and facilitate the opening procedure for users.

In the above arrangement, the bond layer preferably is formed of a mixture of polypropylene and linear low density polyethylene, and a ratio of the polypropylene therein preferably is 40 to 80 wt. %.

With the bond layer of such composition, the easy-peel portion can be peeled at an appropriate strength, and the peel start point upon unsealing is determined to a point to improve stability of the peel start point. Therefore, the package bag employing the zipper tape can improve the peeling feel and facilitate the opening procedure for users.

In the above arrangement, the bond layer preferably includes an extended portion extending to a crosswise end of the seal base relative to the easy-peel layer, and the extended portion preferably is leveled with the first surface of the easy-peel layer.

In other words, the crosswise end of the bond layer is extended to a surface of the easy-peel layer. When the easy-peel layer and the bond layer are heat-fused on the bag body, the bond layer is heat-fused on the bag body at a position adjacent to a portion of the easy-peel layer near the product. Therefore, when the product in the package bag undergoes a retort process, for example, the oil content of the product is prohibited from reaching the fused portion of the easy-peel layer, so that the decrease in the strength of the easy-peel layer is prevented.

A zipper tape according to another aspect of the present invention includes a male member including a first engagement portion and a first belt-like base continued to the first engagement portion and a female member including a second engagement portion and a second belt-like base continued to the second engagement portion, the first and the second engagement portions mating in a pair, in which one of the first and the second belt-like bases is widened from the mating first and second engagement portions to a crosswise end of the one of the first and the second belt-like bases relative to the other of the first and the second belt-like bases in order to define a seal base, a bond layer, an easy-peel layer bonded to the seal base via the bond layer, and a seal layer provided on a first surface of the easy-peel layer are layered on a first surface of the seal base in side of the mating first and second engagement portions, the seal base is formed of polypropylene, the bond layer is formed of a mixture of polypropylene and low density polyethylene, the easy-peel layer is formed of low density polyethylene, and the seal layer is formed of polypropylene.

According to the aspect of the present invention, the easy-peel layer is not directly bonded to the seal base, but is bonded thereto via the bond layer. Therefore, a peel start point of the zipper tape attached to the inner surfaces of the package bag is advantageously stabilized. When the zipper tape not having the bond layer is opened, peeling of the easy-peel layer starts from various points, thereby causing the peeling operation to be unstable. In contrast, if the bond layer is provided to bond the seal base to the easy-peel layer as is in the present invention, peeling is ensured to occur between the seal layer and the easy-peel layer where the bonding force is the weakest. Since the peel start point is thus stabilized, the user can stably and securely conduct an unsealing procedure of the package bag.

In addition, since the seal layer is provided on the surface of the easy-peel layer, the easy-peel layer is fused to the inner surface of the bag body via the seal layer. This also contributes to securable peeling of the seal layer and the easy-peel layer. Therefore, the peel start point is stabilized.

Furthermore, since the seal layer is provided, a difference in peelability due to material compositions of the films of the bag body can be eliminated. Therefore, an unchanged desirable peeling performance can be exhibited regardless of the material compositions of the bag body.

Moreover, with the above arrangement, the seal base is formed of polypropylene; the easy-peel layer is formed of low density polyethylene; and the bond layer that bonds the seal base to the easy-peel layer is formed of a mixture of polypropylene and low density polyethylene. Accordingly, the seal base and the easy-peel layer can securely be bonded.

Since the easy-peel layer is formed of low density polyethylene, an appropriate peel strength is established as compared to, for example, a case in which the easy-peel layer formed of polypropylene adhesive or the like increases the peel strength to hinder peeling. Accordingly, the peeling is facilitated.

Therefore, the package bag employing the zipper tape can improve the peeling feel and facilitate the opening procedure for users.

In the above arrangement, the easy-peel layer preferably is formed of linear low density polyethylene.

The easy-peel layer may be formed of low density polyethylene. However, if the easy-peel layer is formed of linear low density polyethylene, the easy-peel portion can be peeled at an appropriate strength. Therefore, the package bag employing the zipper tape can improve the peeling feel and facilitate the opening procedure for users.

In the above arrangement, the bond layer preferably is formed of a mixture of polypropylene and linear low density polyethylene, and a ratio of the polypropylene therein preferably is 40 to 80 wt. %.

With the bond layer of such composition, the easy-peel portion can be peeled at an appropriate strength, and the peel start point upon unsealing is determined to a position, thus improving the stability of the peel start point. Therefore, the package bag employing the zipper tape can improve the peeling feel and facilitate the opening procedure for users.

In the above arrangement, an end of the seal layer adjacent to the mating first and second engagement portions preferably is disposed farther from the engaged portions than the end of the easy-peel layer adjacent to the engagement portions so that a portion of the first surface of the easy-peel layer adjacent to the mating first and second engagement portions is not covered by the seal layer.

Here, the end of the seal layer or the easy-peel layer near the engagement portion is not a first end near the crosswise end of the seal base but a second end near the engagement portion, the first and second ends of the seal layer or the easy-peel layer being along the extending direction of the engagement portion, that is, along the crosswise end of the seal base.

With this arrangement, when the zipper tape is attached to the package bag, the seal layer is attached to the inner surface of the bag body. Further with the arrangement, since the width of the seal layer is smaller than the width of the easy-peel layer, the stress upon unsealing concentrates between the seal layer and the easy-peel layer, thereby facilitating the unsealing procedure.

In the above arrangement, the bond layer preferably includes an extended portion extending to a crosswise end of the seal base relative to the easy-peel layer, and the extended portion preferably is leveled with the first surface of the easy-peel layer.

In other words, the vicinity of the crosswise end of the bond layer is extended to a surface of the easy-peel layer. When the easy-peel layer and the bond layer are bonded to the seal layer, the bond layer is bonded to the seal layer at a position adjacent to the product relative to the easy-peel layer. Therefore, when the product in the package bag undergoes a retort process, for example, the oil content of the product is prohibited from reaching the bonded portion of the easy-peel layer and the seal layer, so that the decrease in the strength of the easy-peel layer is prevented.

A zipper tape according to still another aspect of the present invention includes a male member including a first engagement portion and a first belt-like base continued to the first engagement portion and a female member including a second engagement portion and a second belt-like base continued to the second engagement portion, the first and the second engagement portions mating in a pair, in which one of the first and the second belt-like bases is widened from the mating first and second engagement portions to a crosswise end of the one of the first and the second belt-like bases relative to the other of the first and the second belt-like bases in order to define a seal base, an easy-peel layer and a bond layer provided on a surface of the easy-peel layer are layered on a surface of the seal base in side of the mating first and second engagement portions, the seal base is formed of polypropylene, the bond layer is formed of a mixture of polypropylene and low density polyethylene, the easy-peel layer is formed of a mixture of low density polyethylene and polypropylene, and a ratio of polypropylene in the easy-peel layer is less than a ratio of polypropylene in the bond layer.

According to the aspect of the present invention, the easy-peel layer is not directly bonded to the package bag, but is bonded thereto via the bond layer. Therefore, peel start point of the zipper tape attached to the inner surfaces of the package bag is advantageously stabilized. When the zipper tape not having the bond layer is opened, peeling of the easy-peel layer starts from various points, thereby causing the peeling operation to be unstable. In contrast, if the bond layer is provided as is in the present invention, the bonding force between the bond layer and the easy-peel layer may be appropriately determined so that the peeling securely occurs between the easy-peel layer and the seal base. Since the peel start point is thus stabilized, the user can stably and securely conduct an unsealing procedure of the package bag.

With this arrangement, the seal base is formed of polypropylene; the easy-peel layer is formed of a mixture of low density polyethylene and polypropylene; and the bond layer that bonds the package bag to the easy-peel layer. Accordingly, the package bag and the easy-peel layer are securely bonded.

Since the easy-peel layer contains low density polyethylene, an appropriate peel strength is established as compared to, for example, a case in which the easy-peel layer formed of polypropylene adhesive or the like increases the peel strength to hinder peeling. Therefore, the peeling is facilitated.

In addition, the ratio of polypropylene in the easy-peel layer is smaller than the ratio of polypropylene in the bond layer. Accordingly, if the zipper tape is attached to the inner surfaces of the package bags, for example, the seal base and the easy-peel layer can be securely bonded, and at the same time, the easy-peel portion can be peeled at a moderate strength.

Therefore, the package bag employing the zipper tape can improve the peeling feel and facilitate the opening procedure for users.

In the above arrangement, the easy-peel layer preferably is formed of a mixture of linear low density polyethylene and polypropylene.

The easy-peel layer may be formed of low density polyethylene. However, if the easy-peel layer is formed of linear low density polyethylene, the easy-peel portion can be peeled at an appropriate strength. Therefore, the package bag employing the zipper tape can improve the peeling feel and facilitate the opening procedure for users.

In the above arrangement, the bond layer preferably is formed of a mixture of polypropylene and linear low density polyethylene, and a ratio of the polypropylene therein preferably is 40 to 80 wt. %.

With the bond layer of such composition, the easy-peel portion can be peeled at an appropriate strength, and the peel start point upon unsealing is determined to a point, thus improving the stability of the peel start point. Therefore, the package bag employing the zipper tape can improve the peeling feel and facilitate the opening procedure for users.

In the above arrangement, the bond layer preferably includes an extended portion extending to a crosswise end of the seal base relative to the easy-peel layer, and the extended portion preferably is bonded to the seal base.

In short, the crosswise end of the bond layer is bonded to the seal base. When the bond layer is heat-fused to the bag body, the bond layer is bonded to the seal base at a position adjacent a portion of the easy-peel layer near the product. Therefore, when the product in the package bag undergoes a retort process, for example, the oil content of the product is prohibited from reaching the bonded portion of the easy-peel layer and the seal base, so that decrease in the strength of the easy-peel layer is prevented.

A package bag having a zipper tape, comprising: the zipper tape according to the above arrangements attached to an inner surface of the bag, in which the zipper tape comprises a male member including a first engagement portion and a first belt-like base continued to the first engagement portion and a female member including a second engagement portion and a second belt-like base continued to the second engagement portion, the first and the second engagement portions mating in a pair, in which a heat-seal portion shaped such that a dimension between the heat-seal portion and the mating male and female engagement portions changes along a longitudinal direction of the one of the first and second belt-like bases and bonded to a facing inner surface of a bag body in an easily peelable manner is provided to the first surface of the seal base in side of the mating first and second engagement portions, and a second surface in opposite side of the engagement portions of the seal base on which the easy-peel layer is layered is not appreciably bonded to another inner surface of the bag body that corresponds to the second surface of the seal base.

Here, a bond in an easily peelable manner indicates a bond in which a surface of the widened portion adjacent to the engagement portion and the facing inner surface of the bag body are bonded in a manner allowing peeling with a moderate force. For example, the peel strength is about 1 to 20 N/15 mm.

In the zipper-equipped bag, the belt-like base of the male member or the female member is widened along the bag body toward the product as compared to the belt-like base of the other of the male member and the female member. The seal base, which is the widened portion of the belt-like base of the female member, is bonded to the facing inner surface of the bag body in an easily peelable manner. Therefore, air-tightness and water-tightness are retained, thereby efficiently preventing a liquid product from entering a gap between the engagement portions of the zipper tape.

In addition, a portion of the surface of the seal base in opposite side of the engagement portion is not appreciably bonded to the facing internal surface of the bag body. Therefore, even when internal pressure is applied to the portion of the bag body adjacent to the product, peeling does not occur between the surface of the seal base in side of the seal base and the facing inner surface of the bag body. Consequently, leakage of the product is prevented. Accordingly, the zipper-equipped bag suitable for use that requires tolerance to internal pressure applied on the portion of the bag body adjacent to the product is provided. Thus, the problem raised by Patent Document 1, which is the change in the peel strength due to the width of the dividing wall, is solved.

In addition, the dimension between the heat-seal portion and the engagement portion changes along the longitudinal direction of the belt-like base. Accordingly, when the zipper tape is opened, stress is concentrated to the point where the dimension between the heat-seal portion and the engagement portion is the smallest (stress concentration point). Peeling starts from this point. Thus, since the force to open the zipper is applied to the stress concentration point, the heat-seal portion is easily peeled.

Further, the ratio of polypropylene in the easy-peel layer is smaller than the ratio of polypropylene in the bond layer. Therefore, the seal base and the easy-peel layer are securely bonded, and at the same time, the easy-peel portion can be peeled from the inner surface of the package bag with a moderate peel strength.

In the above arrangement, the heat-seal portion preferably is shaped to include at least one wave-shaped portion.

Since the heat-seal portion is shaped to include an arch heading toward the opening, when the zipper tape is opened, the stress concentrates at the top of the arch, where peeling starts.

In the above arrangement, the heat-seal portion preferably is shaped to include two or more wave-shaped portions.

Since the heat-seal portion is shaped to include a plurality of arches toward the opening, when the zipper tape is unsealed, the stress concentrates at the top of one of the plurality of arches, where peeling starts.

In the above arrangement, the heat-seal portion is shaped in such manner that radius of curvature of the arch-shaped portion projecting toward an opening of the package bag is smaller than radius of curvature of the arch-shaped portion projecting toward the product-residing side.

With this arrangement, since the arch protruding toward the opening is steeper, the stress is more likely to be concentrated at the stress concentration point, thereby facilitating peeling of the heat-seal portion. On the other hand, the "valley" sinking toward the product is less sloped, so that stress on account of internal pressure is less likely to be applied thereto. Therefore, leakage of the product is prevented.

In the above arrangement, the heat-seal portion preferably has a substantially uniform width.

With this arrangement, since the width of the heat-seal portion is uniform, the top of the arch of the heat-seal portion is ensured to form a stress concentration point, thereby stabilizing the peeling point. If the width of the heat-seal portion is not uniform, stress is also concentrated at a narrow portion of the heat-seal portion, thereby causing the peel start point to be unstable. Since the width of the heat-seal portion is uniform with the above arrangement, the heat-seal portion is formed securely peelable.

A manufacturing apparatus of the package bag having the zipper tape according to still another aspect of the present invention includes a pair of seal bars disposed opposing each other with the package bag having the zipper tape interposed therebetween, wherein at least one of the pair of seal bars includes the same shape as the heat-seal portion.

According to the aspect of the invention, since the seal bar has the same shape as the heat-seal portion, the heat-seal portion can be formed by sealing with the seal bar. Consequently, the zipper-equipped bag that only requires a moderate force to open the zipper tape can be manufactured.

A package bag having a zipper tape according to still another aspect of the present invention, the package bag being formed of plastic films, includes the zipper tape according to the arrangements of the present invention set forth above, in which the zipper tape is heat-fused to each of opposing inner surfaces of the plastic films in an attitude such that the seal base is adjacent to the product-residing side relative to the mating first and second engagement portions, a first surface in side of the mating first and second engagement portions of the seal base on which the easy-peel layer is layered is heat-fused to a first of the inner surfaces of the plastic films via the easy-peel layer or via the easy-peel layer and the bond layer, and a second surface in opposite side of the mating first and second engagement portions of the seal base on which the easy-peel layer is layered is not appreciably bonded to a second of the inner surfaces of the films that faces the second surface of the seal base.

A package bag having a zipper tape according to still another aspect of the present invention, the package bag being formed of plastic films, includes the zipper tape according to the arrangements of the present invention set forth above, in which the zipper tape is heat-fused to each of opposing inner surfaces of the plastic films in an attitude such that the seal base is adjacent to the product-residing side relative to the mating first and second engagement portions, the first surface in side of the mating first and second engagement portions of the seal base on which the easy-peel layer is layered is heat-fused to the first of the inner surfaces of the plastic films via the easy-peel layer or via the easy-peel layer and the bond layer while a portion of the surface of the easy-peel layer adjacent to the mating first and second engagement portions is not heat-fused to the first of the inner surfaces of the films, a second surface in opposite side of the mating first and second engagement portions of the seal base on which the easy-peel layer is layered is not appreciably bonded to a second of the inner surfaces of the films that faces the second surface of the seal base.

A package bag having a zipper tape according to still another aspect of the present invention, the package bag being formed of plastic films, includes the zipper tape according to arrangements of the present invention set forth above, in which the zipper tape is heat-fused to each of opposing inner surfaces of the plastic films in an attitude such that the seal base is adjacent to the product-residing side relative to the mating first and second engagement portions, the first surface in side of the mating first and second engagement portions of the seal base on which the easy-peel layer is layered is heat-fused to a first of the inner surfaces of the plastic films via the seal layer, and a second surface in opposite side of the engagement portions of the seal base on which the easy-peel layer is layered is not appreciably bonded to a second of the inner surfaces of the films that faces the second surface of the seal base.

A package bag having a zipper tape according to still another aspect of the present invention, the package bag being formed of plastic films, includes the zipper tape according to arrangements of the present invention set forth above, in which the zipper tape is heat-fused to each of opposing inner surfaces of the plastic films in an attitude such that the seal base is adjacent to the product-residing side relative to the mating first and second engagement portions, a first surface of the seal base on which the easy-peel layer is layered in side of the mating first and second engagement portions is heat-fused to a first of the inner surfaces of the plastic films via the bond layer, and a second surface in opposite side of the mating first and second engagement portions of the seal base on which the easy-peel layer is layered is not appreciably bonded to a second of the inner surfaces of the films that faces the second surface of the seal base.

In the zipper-equipped bags according to the above aspects of the invention, the belt-like base of the male member or the female member is widened along the bag body toward the product as compared to the belt-like base of the other of the male member and the female member. The seal base, which is the widened portion of the belt-like base of the female member, is bonded to the facing inner surface of the bag body in an easily peelable manner. Therefore, air-tightness and water-tightness are retained, thereby efficiently preventing a liquid product from entering a gap between the engagement portions of the zipper tape.

In addition, a portion of the surface of the seal base in opposite side of the engagement portion is not appreciably bonded to the facing internal surface of the bag body. Therefore, even when internal pressure is applied to the portion of the bag body adjacent to the product, peeling does not occur between the surface of the seal base in side of the seal base and the facing inner surface of the bag body. Consequently, leakage of the product is prevented. Accordingly, the zipper-equipped bag suitable for use that requires tolerance to internal pressure applied on the portion of the bag body adjacent to the product is provided.

Incidentally, a bond in an easily peelable manner indicates a bond in which a surface of the widened portion on which the engagement portion resides and the facing inner surface of the bag body are bonded in a manner allowing peeling with a moderate force. Namely, the peel strength may be about 1 to 20 N/15 mm.

In addition, since the zipper tapes according to the above-described aspects and the derivative arrangements of the present invention are employed, similarly to them, appropriate peel strength is obtained and stability of the peel start point is improved.

Furthermore, when the easy-peel layer or the easy-peel layer and the bond layer excluding a portion of the surface of the easy-peel layer in side of the engagement portion are heat-fused to the inner surface of one of the films, the stress applied upon unsealing is concentrated between the seal layer and the easy-peel layer, thereby facilitating the unsealing procedure.

BEST MODE FOR CARRYING OUT THE INVENTION

First Embodiment

A package bag with a zipper tape (hereafter occasionally abbreviated to a "package bag" or a "zipper-equipped bag") according to a first embodiment of the present invention will be described with reference to FIGS. 1 and 2.

Figure 1:
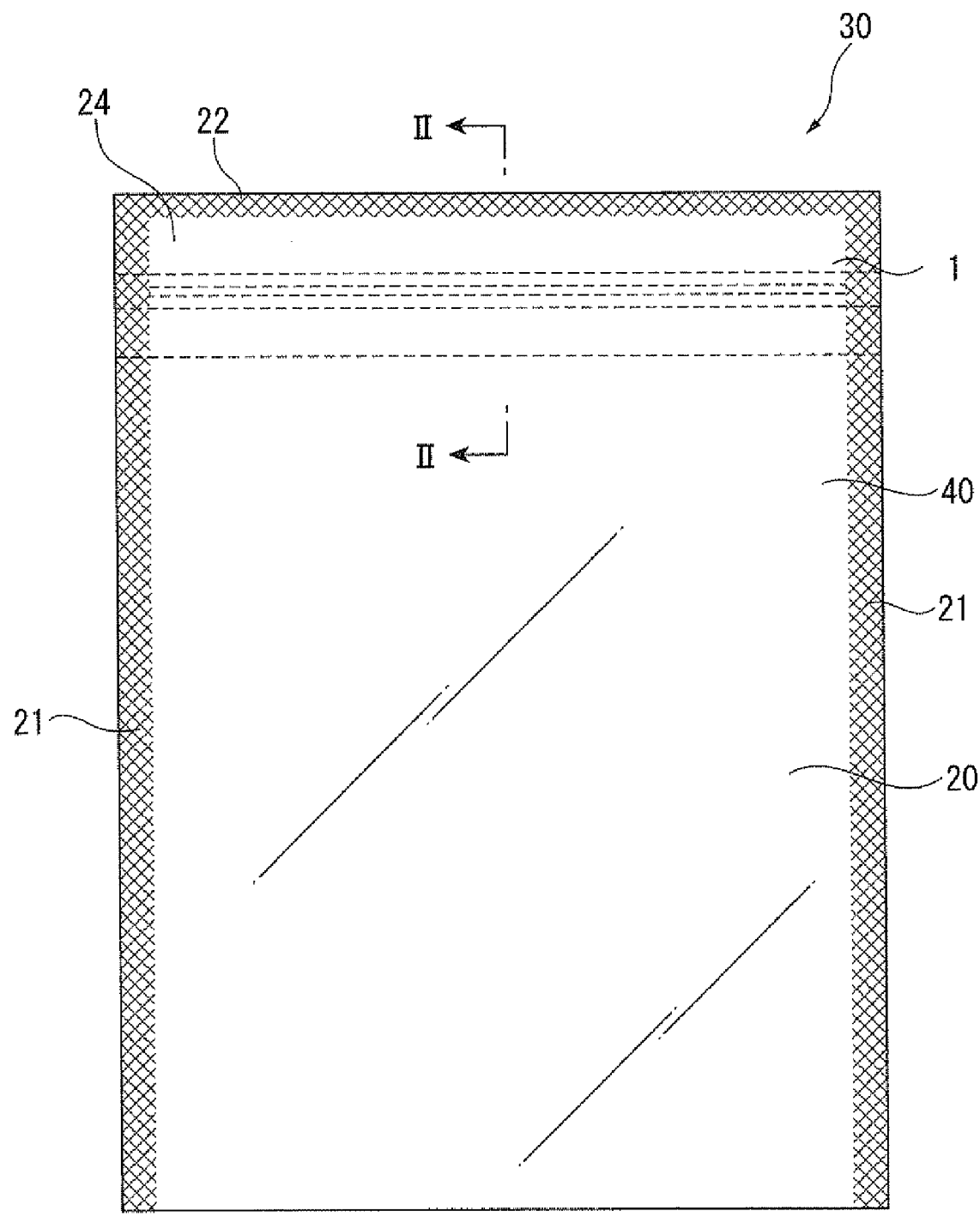
FIG. 1 is a front view showing a package bag having a zipper tape according to a first embodiment of the present invention.

FIG. 1 is a front view showing the package bag having the zipper tape heat-sealed on a bag body thereof. FIG. 2 is a cross-sectional view taken along II-II line in FIG. 1 showing the zipper tape heat-sealed on the bag body that forms the package bag where engagement portions of the zipper tape are engaged.

Figure 2:
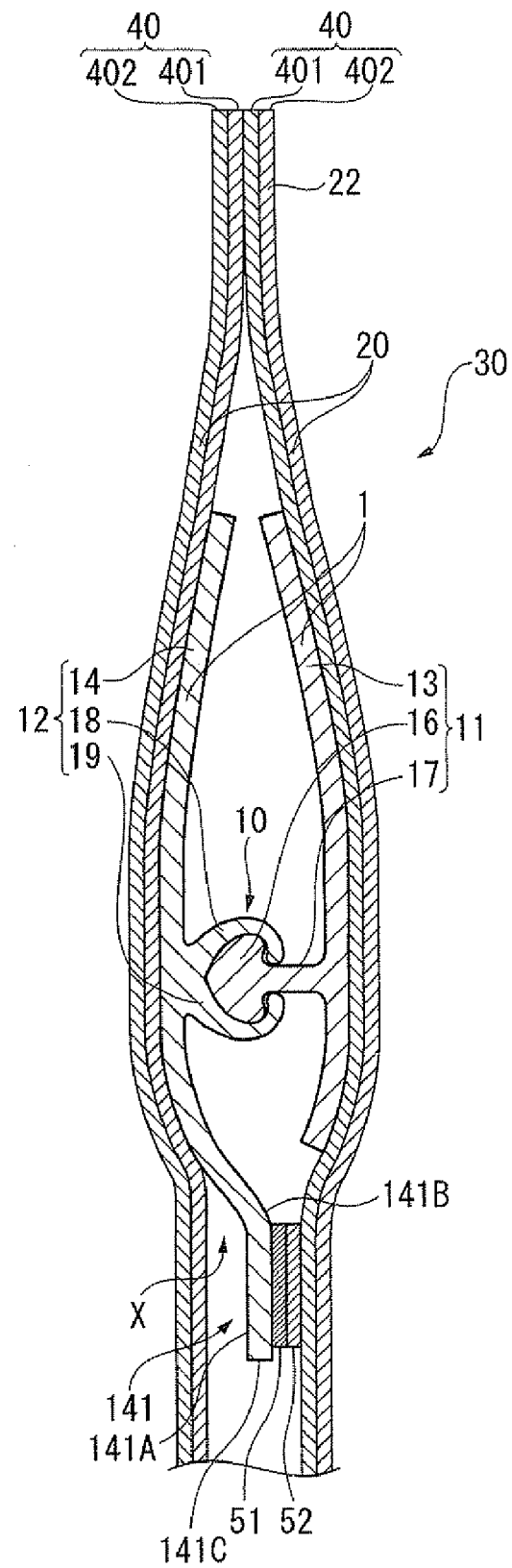
FIG. 2 is a cross-sectional view taken along II-II line in FIG. 1 showing a male member and a female member in an engaged state.

In FIGS. 1 and 2, 1 is the zipper tape, 10 is the engagement portions, 11 is a male member, 12 is a female member, 13 and 14 are belt-like bases, 141 is a seal base (widened portion), 16 is a head, 17 is a connector, 18 is a first hook, 19 is a second hook, 20 is the bag body, 21 is a side seal, 22 is a top seal, 24 is an opening, 30 is the package bag, and 40 is base films (packaging materials).

As shown in FIGS. 1 and 2, the zipper-equipped bag 30 includes the bag body 20, which is formed by superposing the base films 40 (packaging materials) on each other and providing the side seals 21 on peripheries of the base films 40. The zipper tape 1 is attached on an inner surface of the opening 24 of the bag body 20. The zipper tape 1 includes a pair of the male member 11 and the female member 12, both of which are provided with the engagement portion 10 and the belt-like bases 13, 14 continued to the engagement portion 10.

The zipper-equipped bag 30 is made hermetic by sealing a bottom end of the bag body 20 after a product is fed thereto through the bottom end of the bag body 20.

To open the zipper-equipped bag 30, a user cuts off the opening 24. The zipper tape 1 is used to reclose the bag.

As shown in cross section in FIG. 2, the zipper tape 1 includes the male member 11, which is belt-like shaped and made of a thermoplastic resin, and the female member 12 that engages with the male member 11 and is made of a thermoplastic resin.

The male member 11 is integrally formed of the belt-like base 13 fused on the bag body 20, the head 16 possessing an arrowhead-shaped cross section, and the connector 17 that connects the belt-like base 13 and the head 16.

Likewise, the female member 12 is formed of the belt-like base 14 and the first and second hooks 18 and 19, which are connected to the belt-like base 14 and possess arc-shaped cross sections. The first hook 18 and the second hook 19 face each other.

The engagement portions 10 are formed by the head 16 of the male member 11 and the first and second hooks 18 and 19 of the female member 12. The zipper tape 1 is opened and closed via engagement and release of the engagement portions 10.

Of the belt-like bases 13 and 14 integrated with the male and female members 11 and 12, the belt-like base 14 integrated with the female member 12 is extended toward the product in the bag body 20 (i.e. downward in FIGS. 1 and 2) compared to the belt-like base 13 integrated with the male member 11. Thus, the belt-like base 14, which is wider than the belt-like base 13, has an extended portion (i.e. a portion of a greater width) compared to the belt-like base 13. The extended portion forms the seal base 141 residing from the engagement portion 10 to a crosswise end 141C of the belt-like base.

The belt-like bases 13 and 14 are heat-sealed at surfaces in opposite side of the engagement portions 10 onto respective facing inner surfaces of the bag body 20, thereby fixing the zipper tape 1 to the bag body 20. Here, the belt-like base 14 integrated with the female member 12 includes the seal base 141. A surface of the seal base 141 in opposite side of the engagement portion 10 is the surface 141A, which is not appreciably adhered to the facing inner surface of the bag body 20.

On the other hand, the seal base 141 in the belt-like base 14 includes a surface 141B in side of the engagement portion 10. As described below, the surface 141B is bonded in an easily peelable manner to the facing inner surface of the bag body 20 via a bond layer 51 and an easy-peel layer 52 layered on the surface 141B. Here, a bond in an easily peelable manner indicates a bond in which the surface 141B of the seal base 141 in side of the engagement portion 10 and the facing inner surface of the bag body 20 (i.e. a sealant layer 401 of the base film 40) are bonded with each other via the bond layer 51 and the easy-peel layer 52 in manner allowing peeling with a moderate force. The peel strength between the surfaces preferably is about 1 to 20 N/15 mm.

Figure 4:
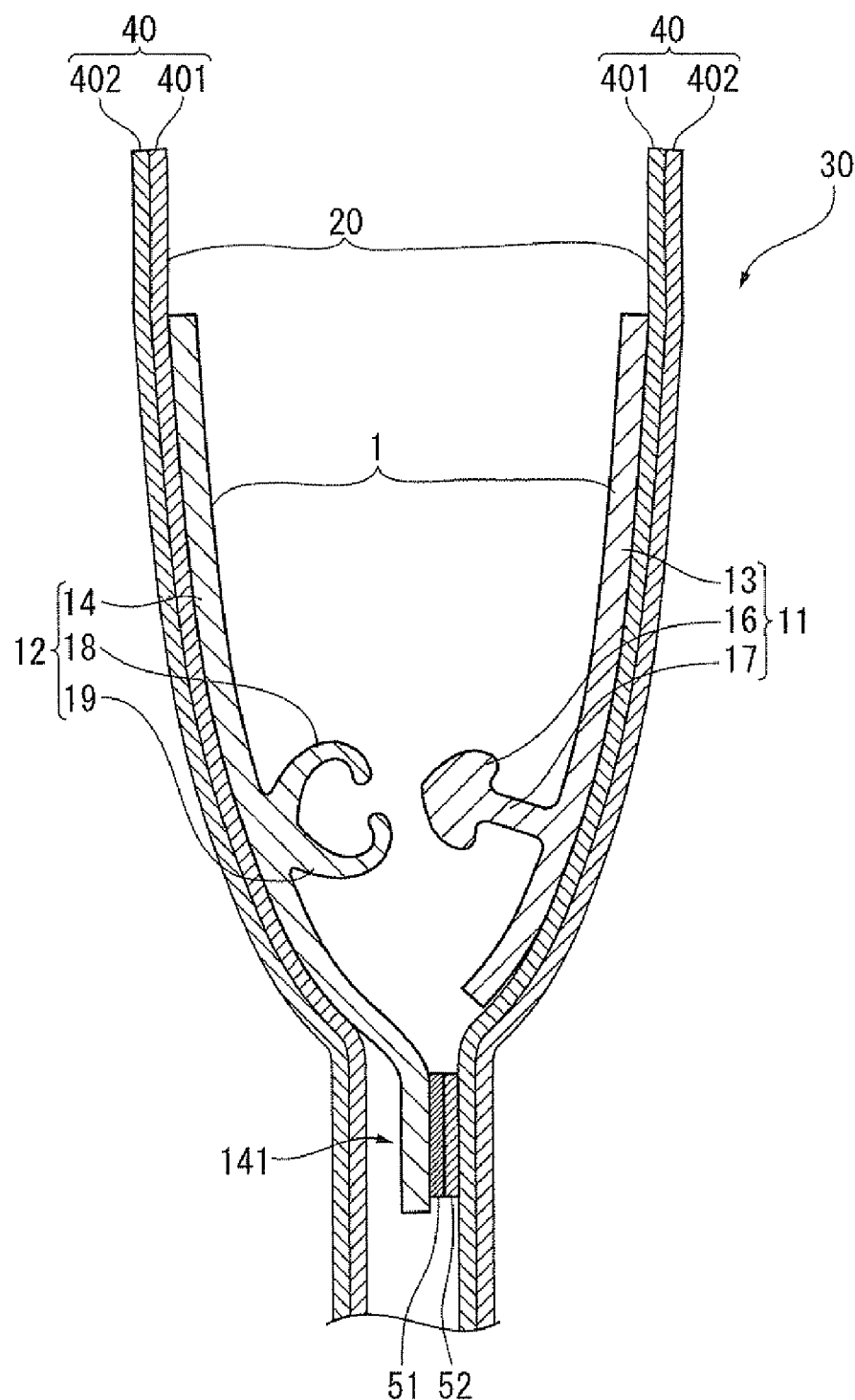
FIG. 4 is a cross-sectional view showing the male member and the female member in FIG. 2 in a disengaged state.
Figure 5:
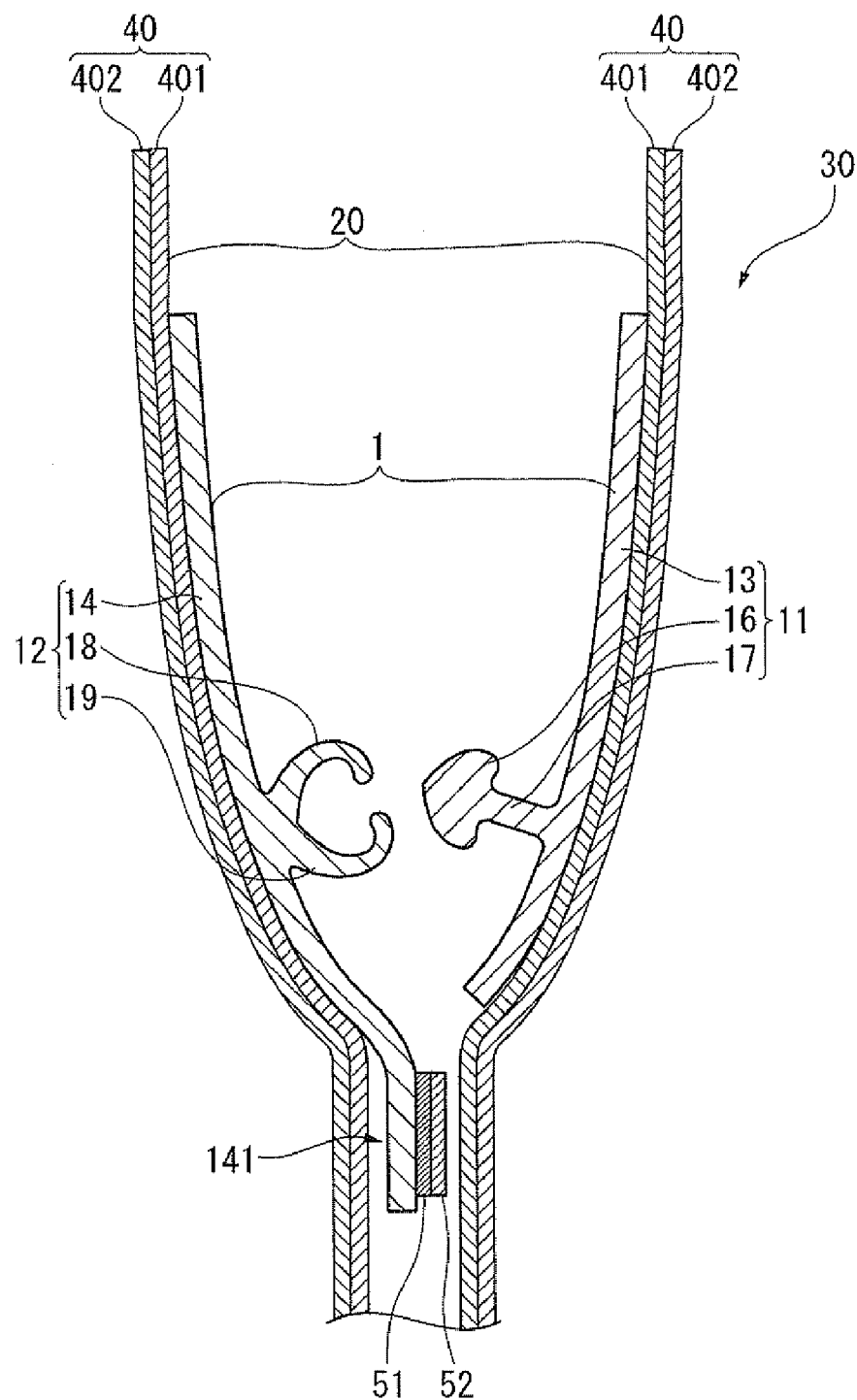
FIG. 5 is a cross-sectional view showing the widened portion (bond layer) and the easy-peal layer in FIG. 2 peeled away from each other.

As shown in FIG. 4, in the embodiment, the easy-peel layer 52 bonded to the seal base 141 via the bond layer 51 is heat-fused on the facing inner surface of the bag body 20 (i.e. the base film 40). As shown in FIG. 5, when the engagement portions 10 are disengaged, the easy-peel layer 52 and the sealant layer 401 are peeled by interfacial peeling or the like.

The male member 11 in the zipper tape 1 of the embodiment can be integrally obtained by coextruding the belt-like base 13 and the head 16 and the connector 17 continuous to the belt-like base 13. Likewise, the female member 12 can be integrally obtained by coextruding the belt-like base 14 and the first and second hooks 18 and 19 continuous to the belt-like base 14. If the zipper tape 1 is molded by such coextrusion, manufacturing process is simplified, manufacturing cost is reduced, and a constant, stable production of the zipper tape 1 is attained.

The male member 11 and the female member 12 of the zipper tape 1 are made of polypropylene. Specifically, a thermoplastic resin such as homopolypropylene, block polypropylene, random polypropylene (RPP), propylene-ethylene-butene-1 random ternary copolymer, polyolefinic specialty soft resin (a TPO (thermoplastic olefin) resin, e.g., a prime polymer TPO) or the like or a mixture of these resins may be employed.

Incidentally, when random propylene (RPP) is used as a resin that forms the zipper tape 1, a melt flow rate (MFR) of the RPP preferably is 0.5 to 20 g/10 min and further preferably is 1 to 15 g/10 min. If the MFR of the random polypropylene is smaller than 0.5 g/10 min, the engagement portions 10 formed continuously and integrally with the belt-like bases 13 and 14 may be poorly extruded. On the other hand, if the MFR is greater than 20 g/10 min, distal ends of the first and the second hooks 18 and 19 may close, or the connector 17 of the male member 11 may collapse, thereby hindering extrusion in a shape predetermined to provide a reclosable zipper tape.

The easy-peel layer 52 is made of low density polyethylene (LDPE) such as linear low density polyethylene (LLDPE) or the like.

The bond layer 51 that bonds the seal base 141 to the easy-peel layer 52 is made of a mixture of polypropylene and low density polyethylene, similarly to the male member 11 and the female member 12. Examples of usable polypropylene include homopolypropylene, block polypropylene, random polypropylene (RPP), propylene-ethylene-butene 1 random ternary copolymer, polyolefinic specialty soft resin (TPO resin) or the like or a mixture of these resins. Examples of usable low density polyethylene include linear low density polyethylene (LLDPE) and the like. A ratio of polypropylene in the bond layer 51 preferably is 40 to 80 wt. %.

The bond layer 51 and the easy-peel layer 52 may be formed as follows. For example, upon extrusion of the zipper tape 1, resins that form the bond layer 51 and the easy-peel layer 52 may undergo multilayer coextrusion so that the bond layer 51 and the easy-peel layer 52 are formed on the surface 141B of the seal base 141 in the belt-like base 14. For another example, the engagement portions 10 and the belt-like bases 13 and 14 may be extruded in advance. After the resins that form the bond layer 51 and the easy-peel layer 52 are liquidized, the liquidized coating material may be coated and dried on the surface 141B of the seal base 141 in side of the engagement portion 10 by a conventional coating method.

The zipper-equipped bag 30 shown in FIG. 1 is obtained by fusing the zipper tape 1 possessing such an arrangement on the base films 40 that form the bag body 20 and making the base films 40 into a bag.

Here, the base film 40 which is a packaging material that forms the bag body 20 preferably is a laminated film formed by the base layer 402 and the sealant layer 401 layered on the base layer 402. However, depending on performances required, lamination of films including a gas barrier layer, a light blocking layer, a strength improving layer, and the like (not shown) may be provided between the base layer 402 and the sealant layer 401 as an intermediate layer.

The base layer 402 may be formed of a biaxially oriented polypropylene film (OPP film) as well as from a biaxially oriented polyester film such as a biaxially oriented polyethylene terephthalate film (PET film), a biaxially oriented polyethylenenaphthalate film (PEN film) or the like or a biaxially oriented polyamide film such as nylon 6, nylon 66, MXD 6 (polymethaxylylene adipamide) or the like. In addition, various engineering plastic films may be employed if necessary. One of the films may be employed alone, or a lamination of a plurality of the films may be employed.

When the intermediate layer is the gas barrier layer, examples of a suitable material include a film of an ethylene-acetic acid vinyl copolymer saponified material (EVOH), polyvinylidene chloride (PVDC), polyacrylonitrile (PAN) or the like, an aluminum foil, a deposited layer of silica, alumina, aluminum or the like, and a coated film of PVDC.

When the deposited layer of silica, alumina, aluminum or the like or the coated film of PVDC is employed, the deposition or the coating may be conducted on the inner surface of the base layer 402, or the deposition or the coating may be conducted in advance on a separate biaxially oriented nylon film (ONy film), a separate biaxially oriented polyethyleneterephthalate film (PET film), a separate biaxially oriented polypropylene film (OPP film) or the like before the films are layered to form the intermediate layer.

Being opaque, the aluminum foil and the aluminum deposition layer can serve as the light blocking layer.

The base layer 402 and the films in the intermediate layer can be laminated by a conventional dry lamination or extrusion lamination (sandwich lamination).

The sealant layer 401 which is the innermost layer may be made of cast polypropylene (CPP).

Incidentally, the sealant layer 401 may be laminated as follows. For example, the above resin is formed into a film, which is laminated by dry lamination or extrusion lamination. For another example, the above resin may be laminated by extrusion coating.

Furthermore, the zipper-equipped bag 30 may be easily manufactured by, for example, a commercially available three-side-seal bag-making machine with a zipper sealing unit.

Incidentally, the fuse condition (temperature, pressure and the like) may be determined in accordance with compositions of the resins that form the zipper tape 1 and the base films 40 that form the bag body 20.

Next, an opening process of the zipper-equipped bag 30 of the embodiment will be described with reference to FIGS. 2, 4, and 5.

In FIG. 2, the male member 11 and the female member 12 of the zipper tape 1 are engaged. In this case, at the lower side (adjacent to the product) of the engagement portions 10 of FIG. 2, the surface 141B of the seal base 141 in the belt-like base 14 of the female member 12, the belt-like base 14 being wider than the belt-like base 13 of the male member 11, is bonded to the facing inner surface of the bag body 20 in an easily peelable manner. Therefore, air-tightness and water-tightness are retained, which prevents a liquid product from entering a gap in the engagement portions 10 in a conveyance process, for example.

In the zipper-equipped bag 30 arranged as shown in FIG. 2, the surface 141A of the seal base 141 in opposite side of the engagement portions 10 is not appreciably bonded to the facing inner surface of the bag body 20. Accordingly, even when internal pressure is applied to a portion of the bag body 20 near the product while the bag undergoes a retort process or the like, for example, stress concentrates at "X" region in FIG. 2. Thus, even when internal pressure is applied, the surface 141B of the seal base 141 in side of the engagement portions 10 is not peeled away from the facing inner surface of the bag body 20. Leakage of the product is inhibited.

When the product is taken out from the package bag 30, as shown in FIG. 4, the opening 24 is cut and the zipper tape 1 is opened to release engagement between the engagement portions 10. In FIGS. 4 and 5, the engagement portions 10 are not shown in engagement since the engagement has been released. Subsequently, an opening force is applied to an upper portion (far from the product) of the bag body 20. The opening force causes the sealant layer 401 of the bag and the easy-peel layer 52 to be peeled from each other, as shown in FIG. 5.

The following effects can be obtained with the above zipper-equipped bag 30.

(1) The zipper-equipped bag 30 of the embodiment has the belt-like base 14 in the female member 12 that is extended toward the product compared to the belt-like base 13 in the male member 11. The widened (i.e. extended) portion of the belt-like base 14 of the female member 12 includes the surface 141B in side of the engagement portion 10, the surface 141B being bonded to the facing inner surface of the bag body 20 in an easily peelable manner. Accordingly, air-tightness and water-tightness are retained, so that a fluid product is prevented from entering into a gap between the engagement portions 10 of the zipper tape 1.

(2) In the belt-like base 14 of the female member 12, the surface 141A of the seal base 141 in opposite side of the engagement portions 10 is not appreciably bonded to the facing inner surface of the bag body 20. Accordingly, even when internal pressure is applied to the product-residing side of the bag body 20, the surface 141B of the seal base 141 in side of the engagement portion 10 is not peeled from the facing inner surface of the bag body 20. Therefore, leakage of the product is prevented.

Consequently, the zipper-equipped bag 30 having such an arrangement is excellent in air-tightness and water-tightness and is free from leakage of the product even when internal pressure is applied to the product-residing side of the bag body 20. Therefore, the zipper-equipped bag 30 can be utilized for packaging a variety of goods such as food, drugs and other medical products, miscellaneous goods, and the like, and can withstand a retort sterilization process conducted at high temperature.

(3) The easy-peal layer 52 is laid on the seal base 141 not directly but via the bond layer 51. Therefore, the bonding force (peel strength) between the bond layer 51 and the easy-peel layer 52 can be adequately adjusted. Accordingly, unsealing is ensured to start from between the sealant layer 401 and the easy-peel layer 52, so that an unseal start point is stabilized.

(4) If the easy-peel layer 52 is formed of linear low density polyethylene, a greater peel strength is provided compared to the case in which normal low density polyethylene is employed. Accordingly, even when the easy-peel layer 52 is heat-fused on the inner surface of the bag body 20 made of a polypropylene film and the product is heat-processed in the retort process, the leakage of the product during the retort process due to peel of the easy-peel layer 52 can be prevented.

If the easy-peel layer 52 is formed not from the low density polyethylene but from, for example, a polypropylene adhesive, the peel strength between the inner surface of the bag body 20 and the easy peel layer 52 is increased so much that the peeling may become difficult or impossible. However, since the easy-peel layer 52 of the embodiment includes the low density polyethylene, an adequate peel strength can be retained.

(5) The bond layer 51 is formed of a mixture of polypropylene and low density polyethylene, so that the bond layer 51 is made of the same material as the seal base 141 and the easy-peel layer 52. Therefore, bonding performance is improved.

Moreover, if the bond layer 51 is formed of a mixture of polypropylene and linear low density polyethylene in which the polypropylene occupies 40 to 80 wt. % of the mixture, an adequate peel strength is retained. In other words, if the polypropylene occupies, for example, about 30 wt. % of the mixture, the peel strength after the retort process is greatly reduced. However, such reduction can be avoided if the above-mentioned mixture ratio of 40 to 80 wt. % is employed.

(6) The male member 11 and the female member 12 are formed of polypropylene, thereby improving heat resistance thereof.

Second Embodiment

Next, a zipper tape and a zipper-equipped bag of a second embodiment according to the present invention will be described with reference to FIGS. 6 and 7.

Note that the same structures and the same members as those of the above-described embodiment are provided with the same numerals, and detailed descriptions of such structures and members are omitted or simplified.

The zipper tape 1 set forth in the first embodiment has the easy-peel layer 52 that is laid on an entire first surface of the bond layer 51.

Figure 6:
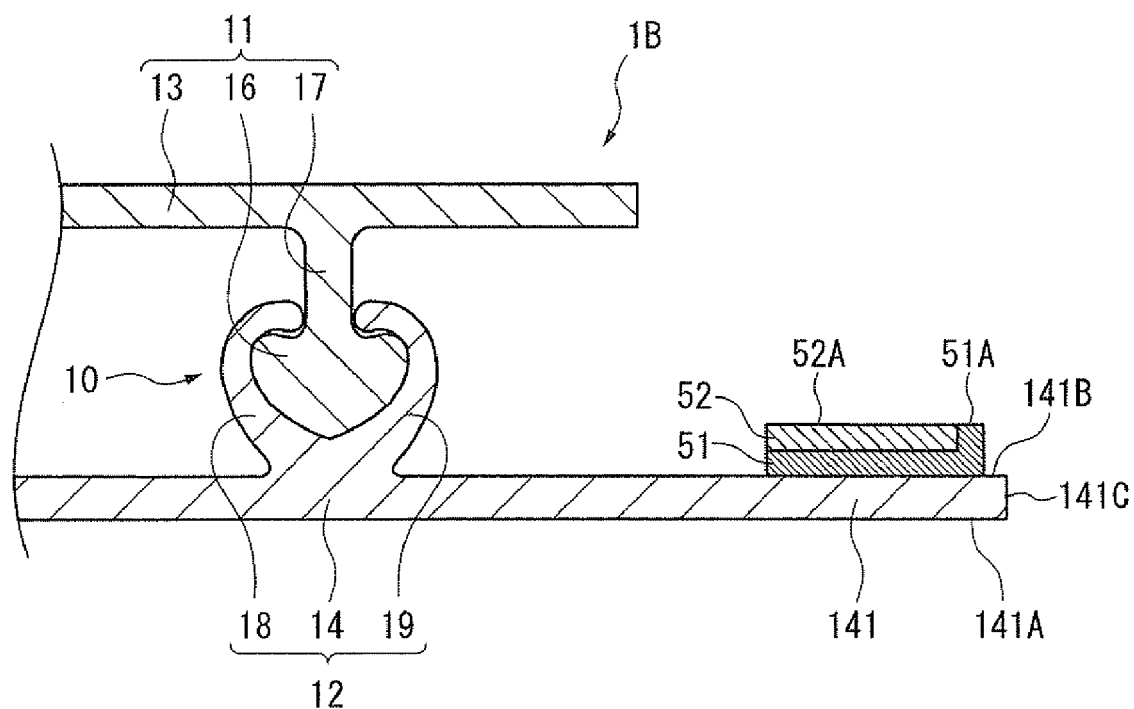
FIG. 6 is a cross-sectional view showing a zipper tape of a second embodiment.

As shown in FIG. 6, in the zipper tape 1B of the second embodiment, the bond layer 51 is extended to the crosswise end 141C of the seal base 141 relative to the easy-peel layer 52. The surface 51A of the extended portion is leveled with the surface 52A of the easy-peel layer 52. Being the same as the first embodiment, description of the second embodiment will be omitted except for layer structures of the bond layer 51 and the easy-peel layer 52.

Figure 7:
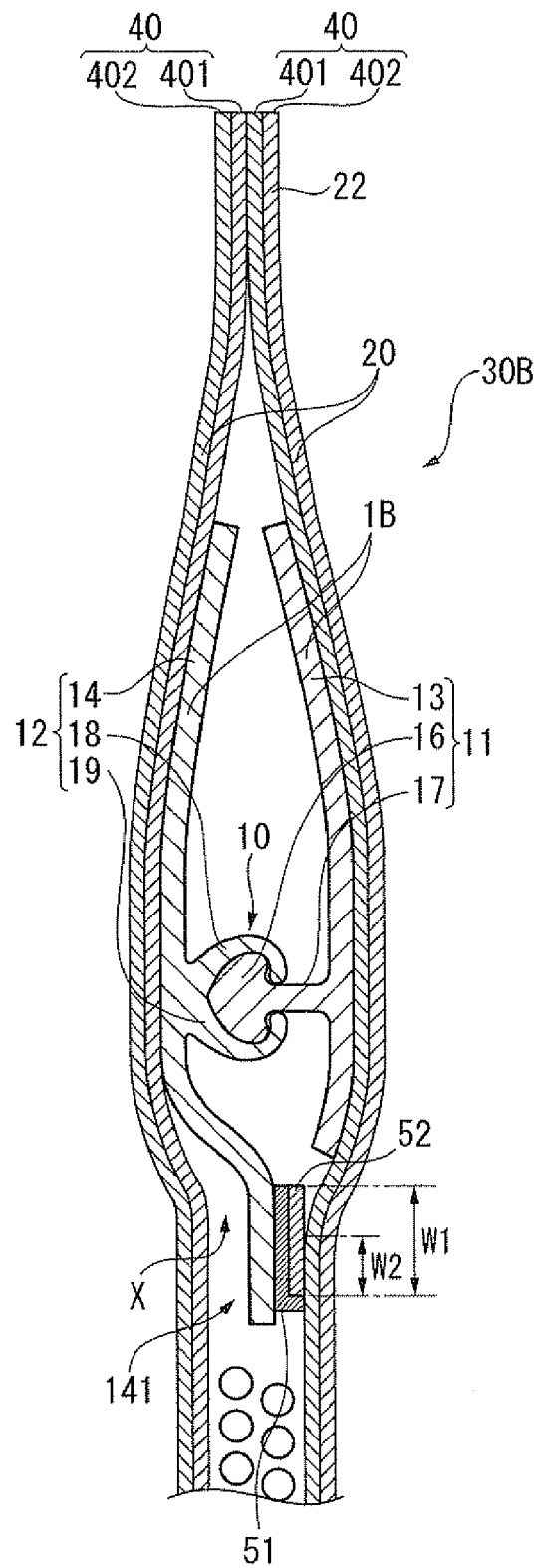
FIG. 7 is a cross-sectional view showing a package bag having the zipper tape of the second embodiment.

As shown in FIG. 7, in the zipper-equipped bag 30 to which the zipper tape 1B is attached, the surface 52A of the easy-peel layer 52 and the surface 51A of the bond layer 51 are heat-fused on the inner surface of the bag body 20.

When the easy-peel layer 52 is heat-fused on the inner surface of the bag body 20, an entire surface of the surface 52A of the easy peel layer 52 is not heat-fused, but a portion of the surface 52A is heat-fused. More specifically, the surface 52A of the easy-peel layer 52 is heat-sealed from an end adjacent to the crosswise end 141C of the seal base 141 halfway toward the engagement portions 10. In short, a portion of the surface 52A near the engagement portions 10 (unsealing side) is not fused on the bag body 20. In other words, a width W2 of the portion of the easy-peel layer 52 that is heat-fused on the inner surface of the bag body 20 is smaller than a width W1 of the easy-peel layer 52 which is taken in a direction perpendicular to an extending direction of the female member 12.

When the zipper tape 1 of the second embodiment undergoes an unsealing process similar to that in the first embodiment, peeling occurs between the sealant layer 401 and the easy-peel layer 52. The portion of the bond layer 51 that is extended to the crosswise end 141C relative to the easy-peel layer 52 is divided into a section bonded to the seal base 141 and a section in side of the surface 51A heat-fused to the inner surface of the bag body 20. Consequently, the easy-peel portion is peeled, and the zipper tape 1 is unsealed.

According to the second embodiment, the following effects can be obtained in addition to the same functions and effects as the first embodiment.

(2-1) Since the surface 51A of the bond layer 51 is heat-fused on the bag body 20, the product is inhibited during the retort process or the like from reaching the portion where the easy-peel layer 52 and the bag body 20 are heat-fused. Accordingly, decrease in the strength of the easy-peel layer 52 due to oil content or such in the product during a retort process is prevented, thereby preventing the peel of the easily peelable portion.

(2-2) The width W2 of the portion of the easy-peel layer 52 that is heat-fused on the inner surface of the bag body 20 is smaller than the width W1 of the easy-peel layer 52. Accordingly, stress tends to concentrate at the unsealing side of the easy-peel layer 52 which is not heat-fused. Therefore, the sealant layer 401 and the easy-peel layer 52 are unsealed from each other easily and steadily.

Third Embodiment

Figure 8:
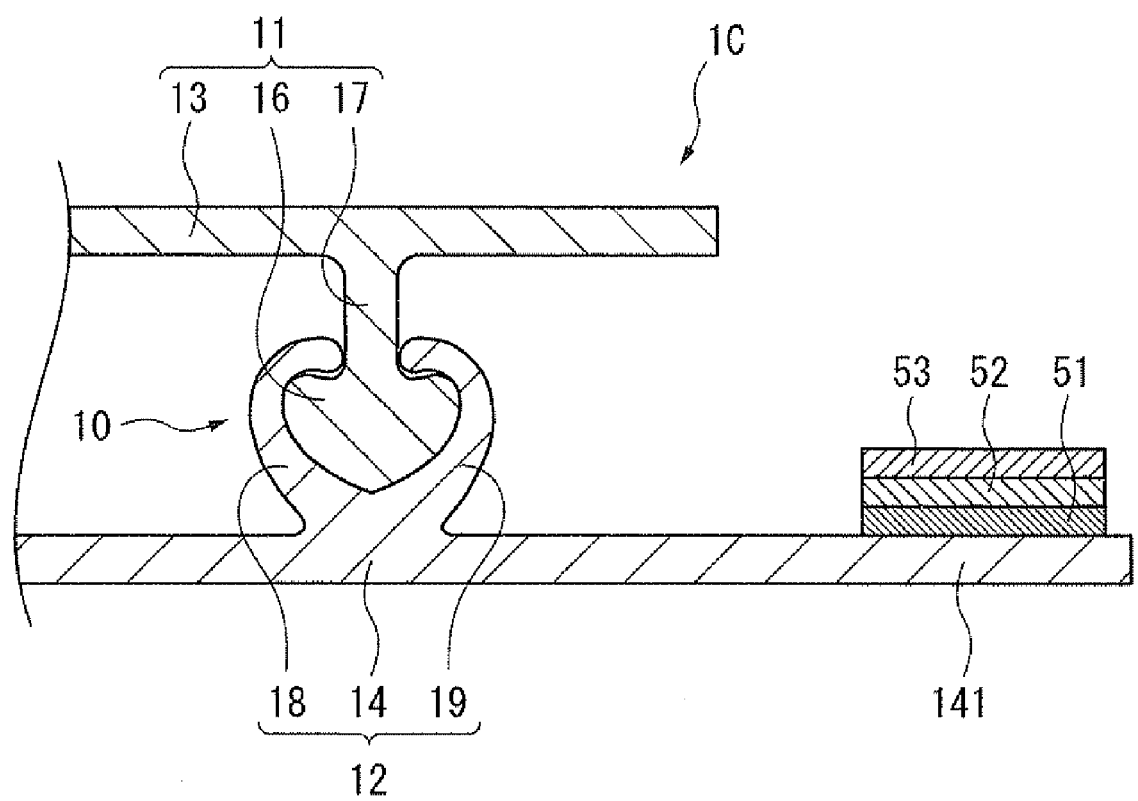
FIG. 8 is a cross-sectional view showing a zipper tape of a third embodiment.

Nest, a zipper tape of a third embodiment according to the present invention will be described with reference to FIG. 8.

A zipper tape 1C of the third embodiment differs from the zipper tape in the first embodiment in that a seal layer 53 is layered on a top surface of the easy-peel layer 52. In other words, the bond layer 51, the easy-peel layer 52, and the seal layer 53 are sequentially layered on top of the seal base 141 in the zipper tape 1C.

Similarly to the above embodiment, the seal base 141 is formed of polypropylene, the bond layer 51 is formed of a mixture of polypropylene and low density polyethylene, and the easy-peel layer 52 is formed of low density polyethylene. The seal layer 53 is formed of polypropylene.

Similarly to the first embodiment, if the retort process and such is to be conducted, the easy-peel layer 52 preferably is formed of linear polyethylene. The bond layer 51 is preferably formed of a mixture of polypropylene and linear low density polyethylene where the polypropylene occupies 40 to 80 wt. % of the mixture.

In the embodiment, the seal layer 53 may be heat-fused on the inner surface of the bag body 20.

When the zipper tape of the third embodiment undergoes an unsealing process similarly to the first embodiment, peeling similar to that in the first embodiment occurs between the easy peel layer 52 and the seal layer 53 to unseal the zipper tape.

According to the embodiment, the following effects can be obtained in addition to the same functions and effects as the first embodiment.

(3-1) Since the seal layer 53 is provided to the surface (near the inner surface of the bag body 20) of the easy-peel layer 52, the easy-peel layer 52 can be securely peeled without being affected by the compositions of materials from which the sealant layer 401 is formed.

Fourth Embodiment

Next, a zipper tape of a fourth embodiment according to the present invention will be described with reference to FIG. 9.

The zipper tape 1D of the fourth embodiment differs from the zipper tape in the third embodiment in that a portion of the seal layer 53 near the female member 12 (i.e. near the engagement portions 10 and near the unsealing side) does not cover the surface 52A of the easy-peel layer 52.

In the zipper-equipped bag of the embodiment, the seal layer 53 may be heat-fused on the inner surface of the bag body 20.

When the zipper tape of the fourth embodiment undergoes an unsealing process similarly to the first embodiment, peeling similar to that in the first embodiment occurs between the easy peel layer 52 and the seal layer 53 to unseal the zipper tape.

According to the embodiment, the following effects can be obtained in addition to the same functions and effects as the first and third embodiments.

(4-1) The seal layer 53 does not cover the entire surface 52A of the easy-peel layer 52. The seal layer 53 does not cover a portion of the surface 52A near the unsealing side (i.e. near the engagement portions 10). Accordingly, when the zipper tape in which the seal layer 53 has been sealed on the sealant layer 401 is to be unsealed, stress is likely to concentrate between the seal layer 53 and the easy peel layer 52, thereby facilitating the unsealing procedure.

Fifth Embodiment

Next, a zipper tape 1E and a zipper-equipped bag 30E of a fifth embodiment according to the present invention will be described with reference to FIGS. 10 and 11.

Figure 10:
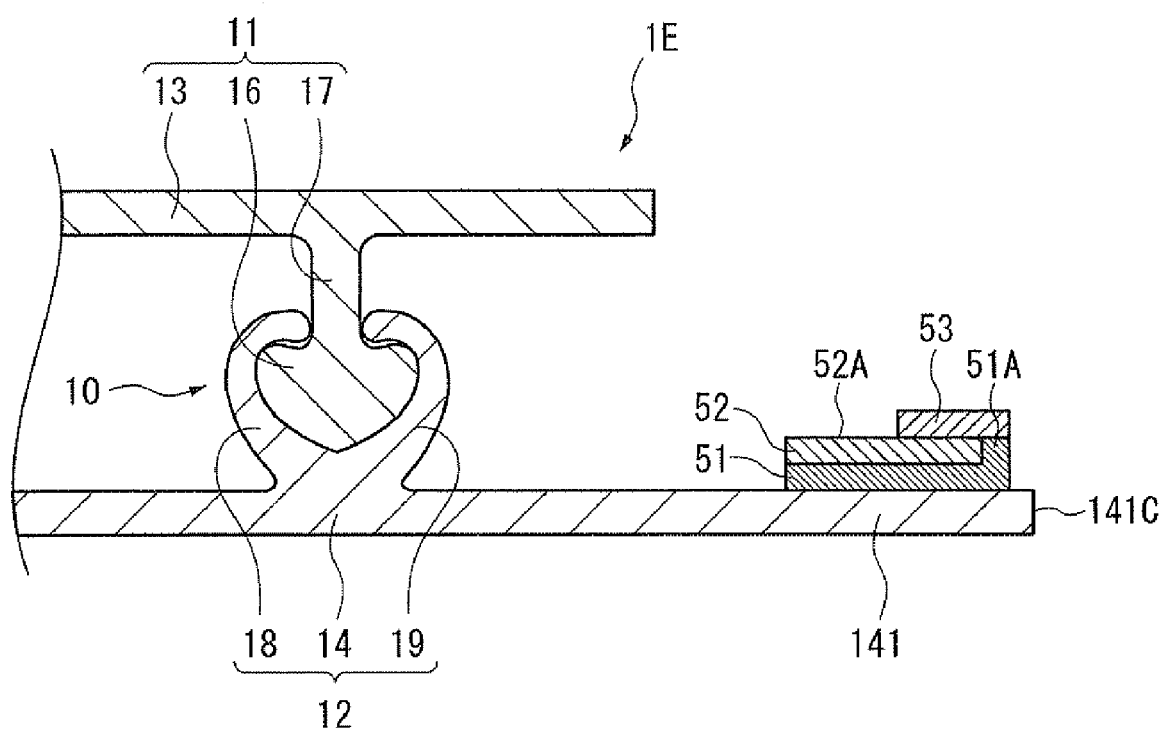
FIG. 10 is a cross-sectional view showing a zipper tape of a fifth embodiment.

As shown in FIG. 10, the zipper tape 1E of the embodiment differs from the zipper tape 1B of the second embodiment in that the seal layer 53 is layered on the surface 51A of the bond layer 51 and a portion of the surface 52A of the easy-peel layer 52. Incidentally, the seal layer 53 does not cover the unsealing side (the region near the engagement portion 10) of the surface 52A on the easy-peel layer 52, similarly to the fourth embodiment.

Figure 11:
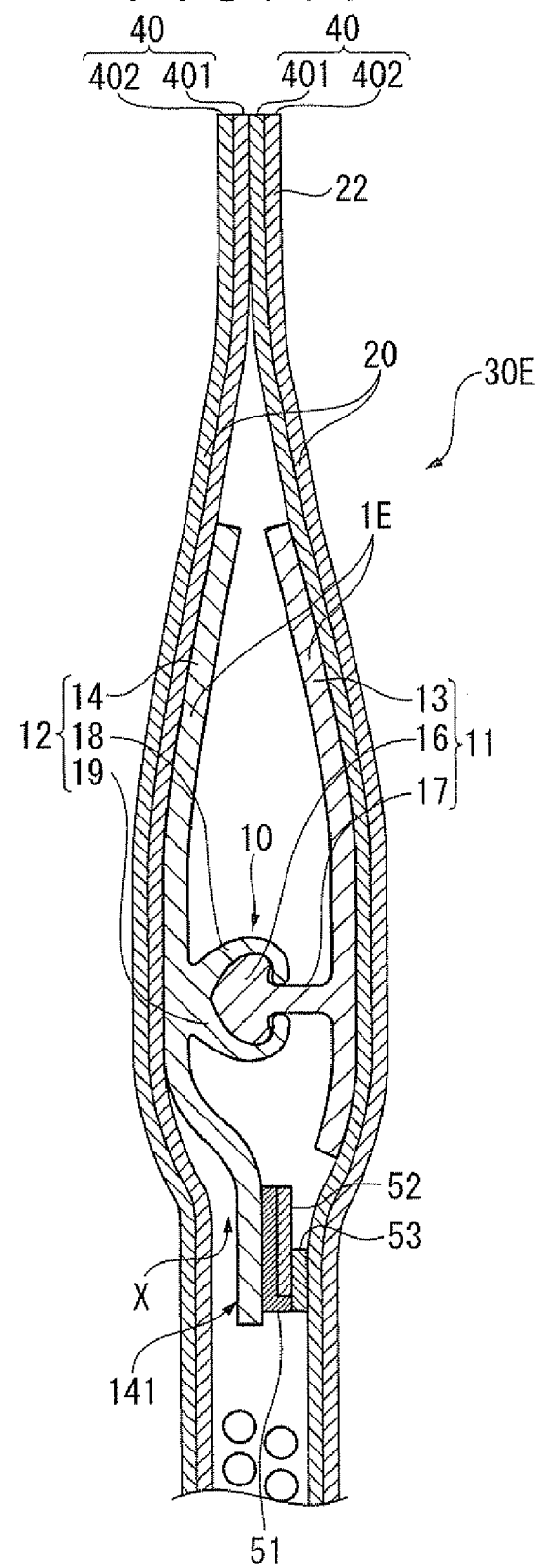
FIG. 11 is a cross-sectional view showing a package bag having the zipper tape of the fifth embodiment.

As shown in FIG. 11, in the zipper-equipped bag 30E to which the zipper tape 1E is attached, only the seal layer 53 is heat-fused on the inner surface of the bag body 20.

When the zipper tape of the fifth embodiment undergoes an unsealing process similarly to the second embodiment, peeling similar to that in the second embodiment occurs between the easy-peel layer 52 and the seal layer 53, and a portion of the bond layer 51 is divided, so that the zipper tape is unsealed.

In such an embodiment, the same functions and effects as the first to fourth embodiments can be obtained.

Sixth Embodiment

Next, a zipper tape 1F of a sixth embodiment according to the present invention will be described with reference to FIG. 12.

In the zipper tape 1F of the sixth embodiment, the easy-peel layer 52 is layered on the seal base 141, and the bond layer 51 is layered on the easy-peel layer 52. In short, the layers are inversely arranged compared to the first embodiment.

Note that description of the specific composition of the bond layer 51 and the easy-peel layer 52 of the embodiment are omitted because they are the same as those of the above embodiments.

In the zipper-equipped bag of the embodiment, the bond layer 51 may be heat-fused on the inner surface of the bag body 20.

When the zipper tape of the sixth embodiment undergoes an unsealing process similarly to the above embodiments, peeling occurs between the seal base 141 and the easy-peel layer 52 and the zipper tape is unsealed.

In the embodiment, the bond layer 51 is heat-fused on the inner surface of the bag body 20. When the zipper tape undergoes an unsealing process, the easy-peel layer 52 and the seal base 141 are securely peeled similarly to the above embodiments, and similarly to the third to fifth embodiments, stability in the peel start point improves without being affected by the composition of the sealant layer 401.

Seventh Embodiment

Next, a zipper tape 1G and a zipper-equipped bag 30G of a seventh embodiment according to the present invention will be described with reference to FIGS. 13 and 14.

Figure 13:
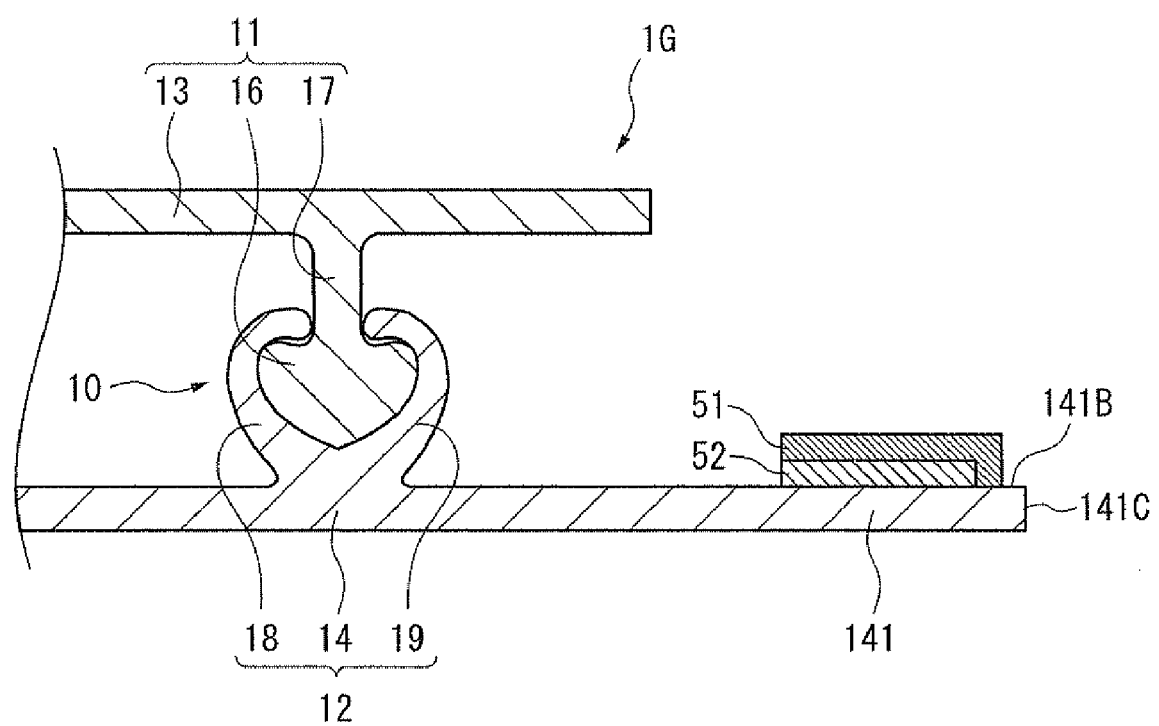
FIG. 13 is a cross-sectional view showing a zipper tape of a seventh embodiment.
Figure 14:
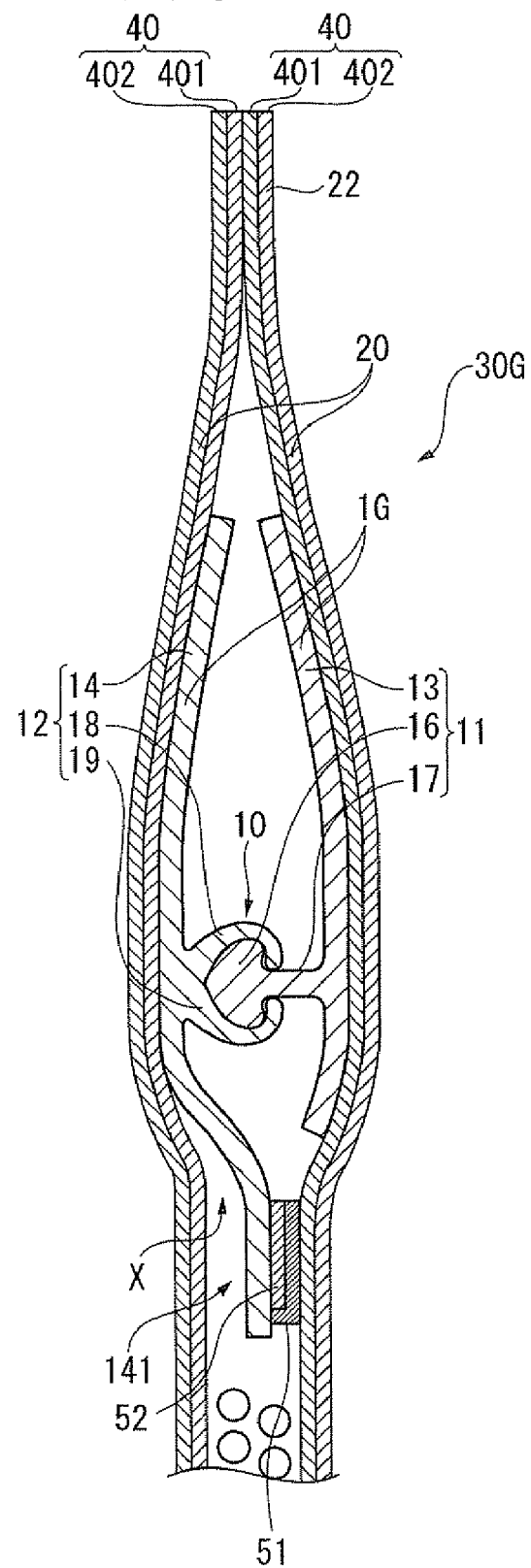
FIG. 14 is a cross-sectional view showing a package bag having the zipper tape of the seventh embodiment.

As shown in FIGS. 13 and 14, the zipper tape 1G of the embodiment differs from the zipper tape 1F of the sixth embodiment in that the bond layer 51 is extended to the crosswise end 141C of the seal base 141 relative to the easy-peel layer 52 and the extended portion is abutted to the surface 141B of the seal base 141 in side of the engagement portion. Being the same as the sixth embodiment, description of the seventh embodiment will be omitted except for layer structures of the bond layer 51 and the easy-peel layer 52.

As shown in FIG. 14, in the zipper-equipped bag 30G to which the zipper tape 1G is attached, the bond layer 51 is heat-fused on the inner surface of the bag body 20.

When the zipper tape of the seventh embodiment undergoes an unsealing process similarly to the sixth embodiment, peeling similar to that in the sixth embodiment occurs between the seal base 141 and the easy peel layer 52, and a portion of the bond layer 51 is divided similarly to the second and fifth embodiments, so that the zipper tape is unsealed.

The same functions and effects as the sixth embodiment can be obtained by the embodiment. In addition, since the bond layer 51 is extended toward the crosswise end 141C to be abutted to the seal base 141, decrease in the strength of the easy-peel layer 52 due to oil content or such in the product is prevented.

Eighth Embodiment

Next, a zipper-equipped bag of an eighth embodiment according to the present invention will be described with reference to FIGS. 15 to 19.

Figure 15:
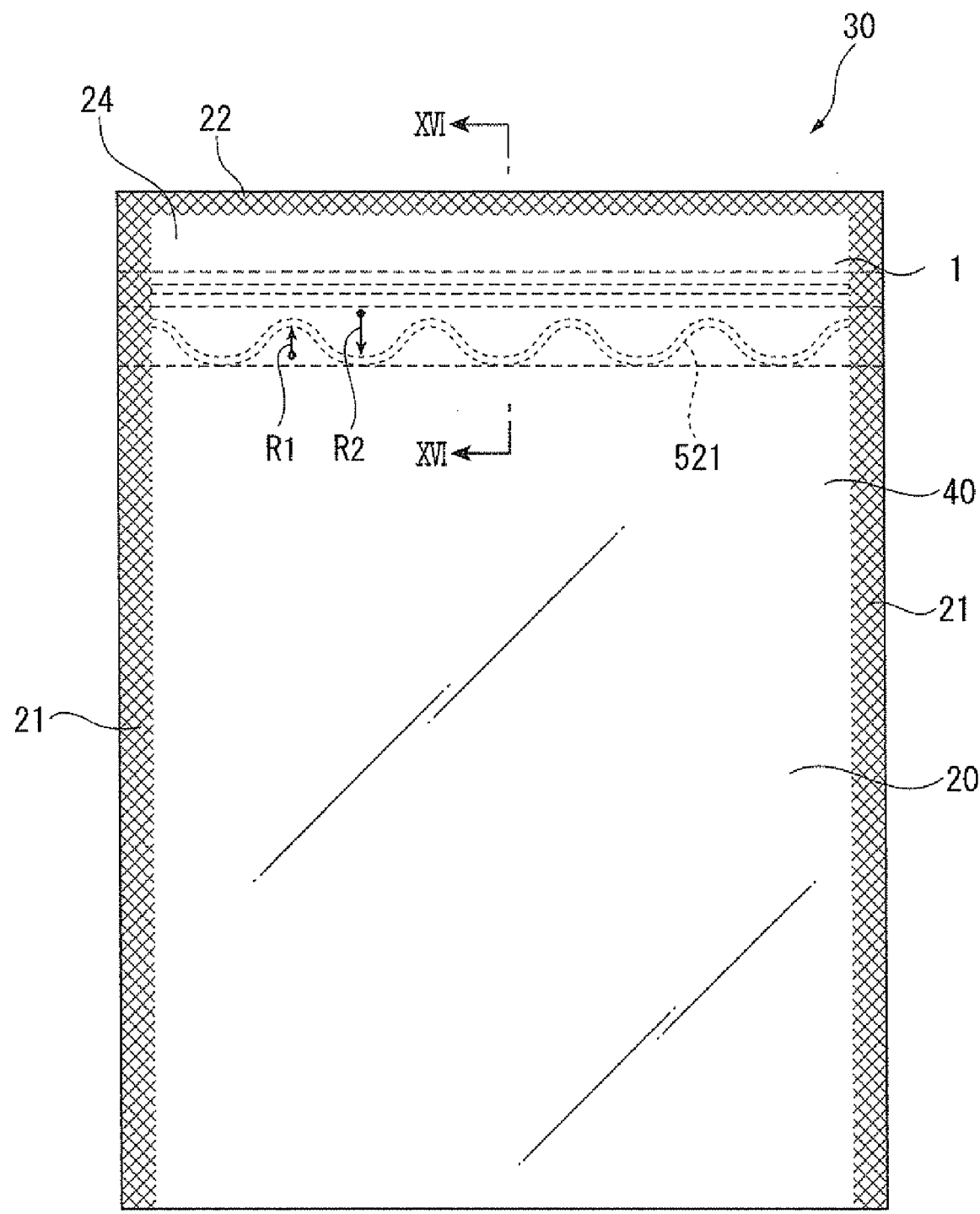
FIG. 15 is a front view showing a package bag having a zipper tape according to an eighth embodiment of the present invention.
Figure 16:
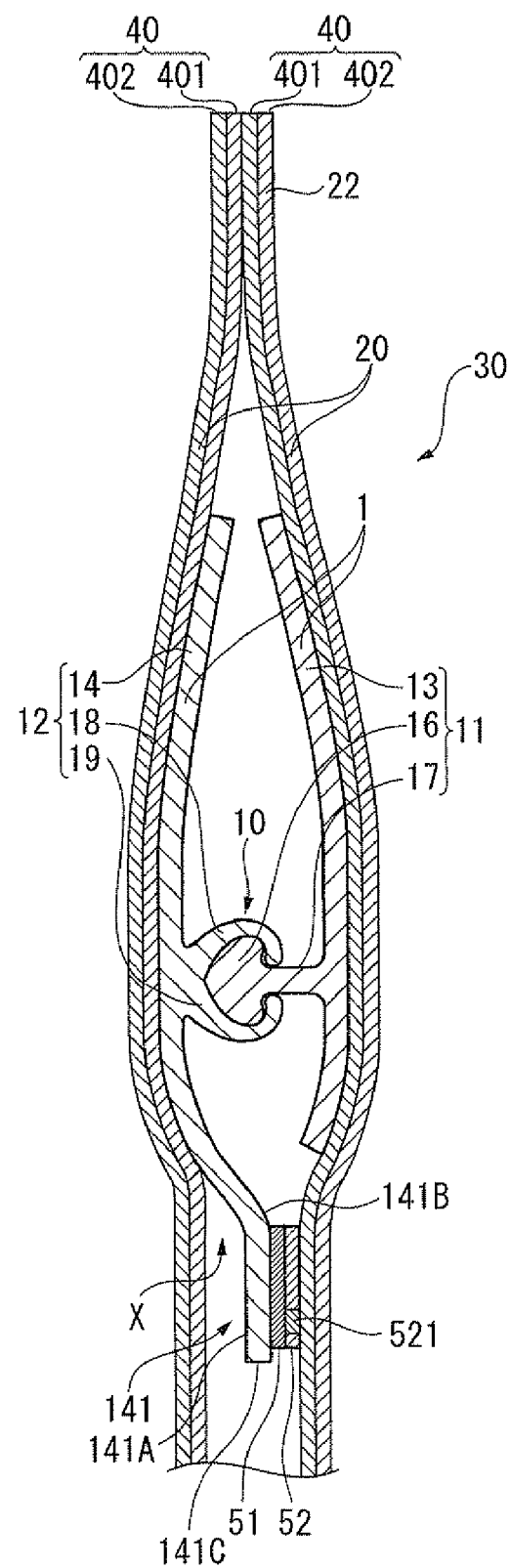
FIG. 16 is a cross-sectional view taken along XVI-XVI line in FIG. 15 showing a male member and a female member in an engaged state.
Figure 17:
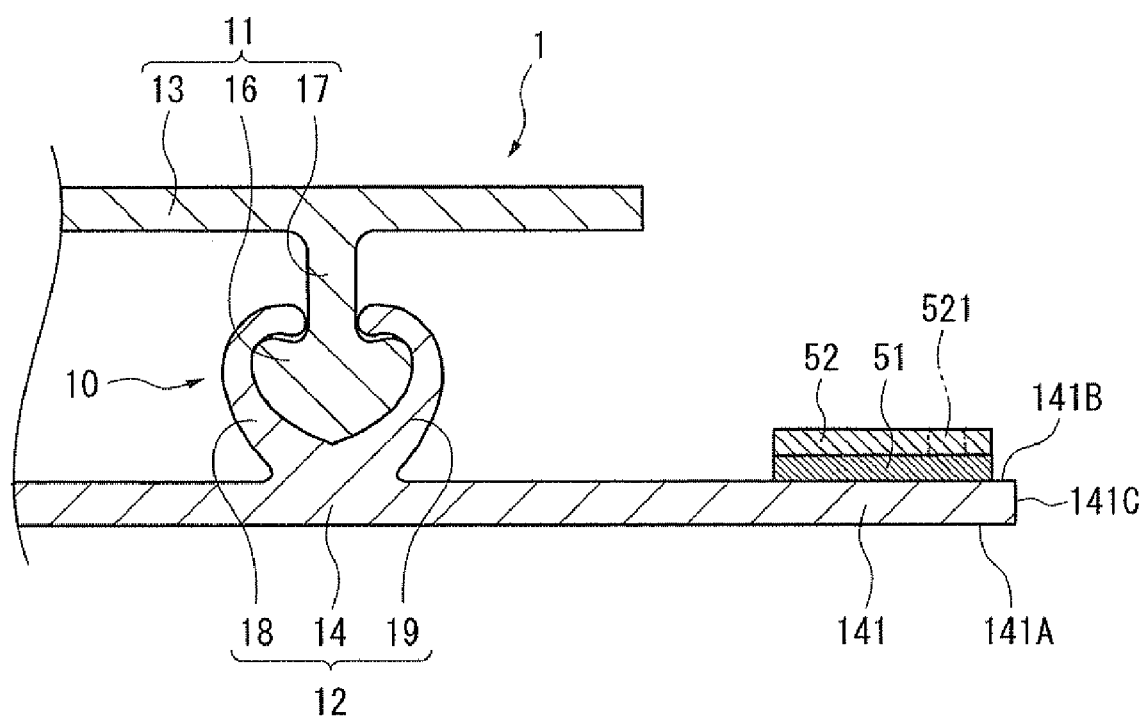
FIG. 17 is a cross-sectional view showing the zipper tape of the eighth embodiment.

As shown in FIGS. 15 and 16 and set forth below, in the zipper-equipped bag 30 of the embodiment, the bond layer 51 and the easy-peel layer 52 are layered on the surface 141B in side of the engagement portion 10 of the seal base 141 in the belt-like base 14. The bond layer 51 and the easy-peel layer 52 respectively have a belt-like shape with a predetermined thickness. A portion of the easy-peel layer 52 forms a heat-seal portion 521 along a longitudinal direction.

The distance between the heat-seal portion 521 and the engagement portions 10 is not fixed at a single value. As shown in FIG. 15, the heat-seal portion 521 is formed in a shape of a plurality of arches, each of the plurality of arches having a top approaching the opening 24. The tops of the plurality of arches function as stress concentration points. Angles formed by pairs of slopes adjacent to the stress concentration points are smaller than angles formed by pairs of slopes adjacent to tops of inversely-defined arches whose tops are directed toward the products. In other words, radius of curvature R1 of the arches of the heat-seal portion 521 is smaller than radius of curvature R2 of "valleys" (inverse arches) of the heat-seal portion 521. Incidentally, the heat-seal portion 521 has a substantially uniform width.

Of the easy-peel layer 52, only the heat-seal portion 521 is bonded to the facing inner surface of the bag body 20 in an easily peelable manner. As described below, the heat-seal portion 521 is formed when a heated seal bar 60 is pressed onto the easy-peel layer 52 via the bag body 20 (see, FIGS. 20 and 21). A pressing projection 60A shaped including a series of arches similarly to the heat-seal portion 521 is formed on the pressing surface of the seal bar 60 (see, FIG. 22).

Here, a bond in an easily peelable manner indicates a bond in which the surface 141B of the seal base 141 in side of the engagement portion 10 and the facing inner surface of the bag body 20 (i.e. the sealant layer 401 of the base film 40) are bonded with each other via the bond layer 51 and the heat-seal portion 521 in a manner allowing peeling with a moderate force. The peel strength between the surfaces preferably is about 1 to 20 N/15 mm.

Figure 18:
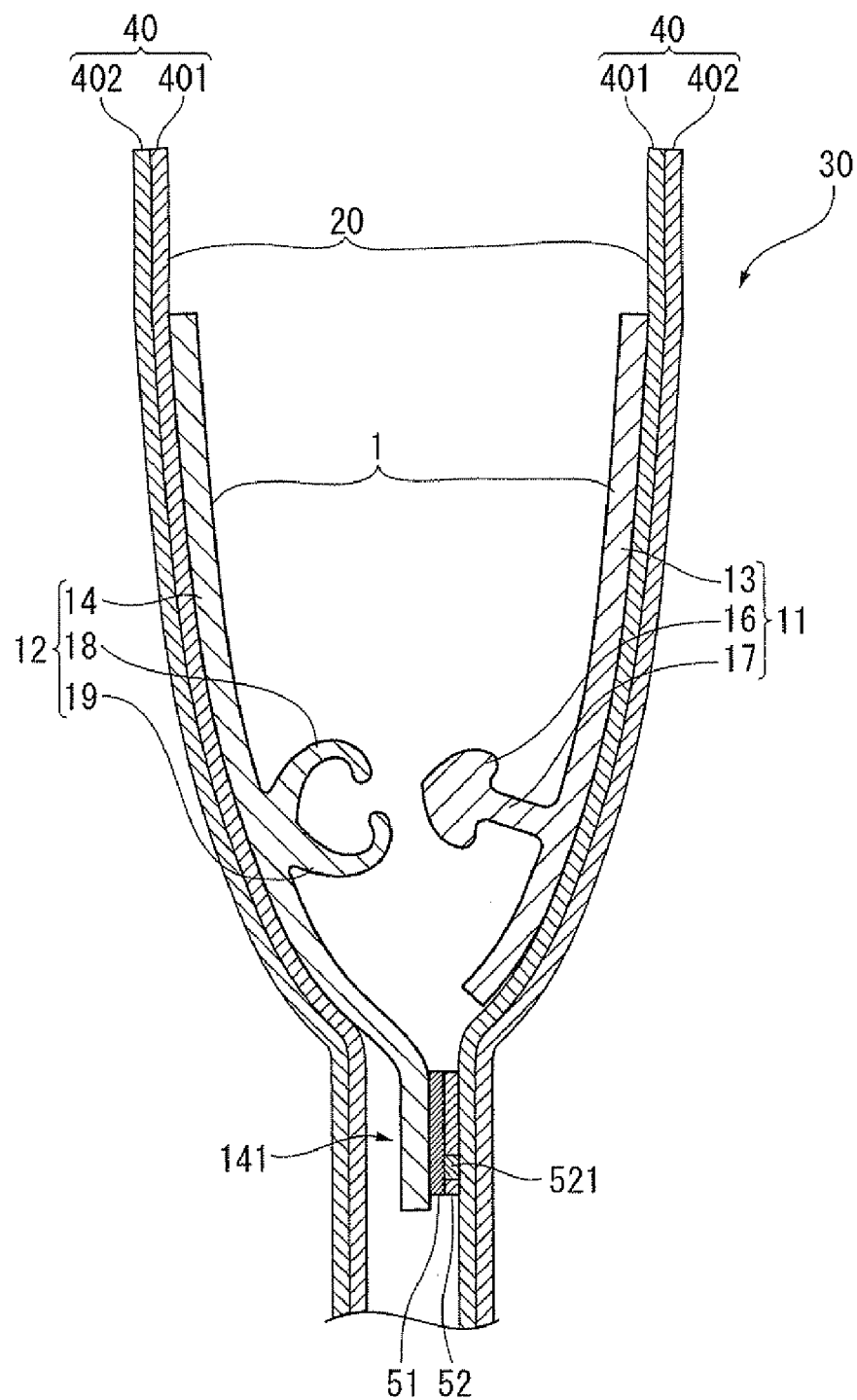
FIG. 18 is a cross-sectional view showing the male member and the female member in FIG. 16 in a disengaged state.
Figure 19:
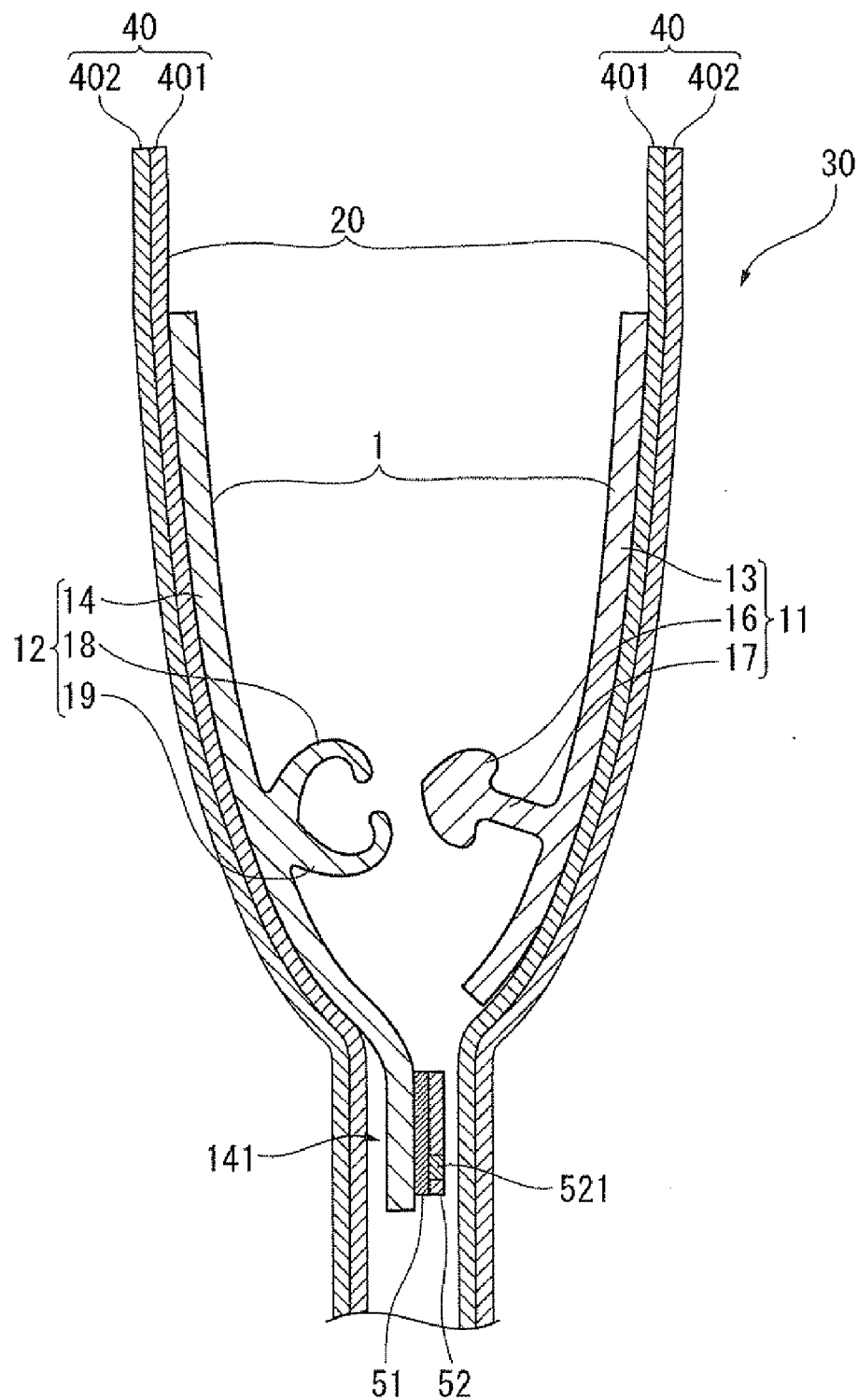
FIG. 19 is a cross-sectional view showing a heat-seal portion and a base film in FIG. 16 peeled away from each other.

As shown in FIG. 18, in the embodiment, the easy-peel layer 52 bonded to the seal base 141 via the bond layer 51 is fused on the facing inner surface of the bag body 20 (i.e. the base film 40). As shown in FIG. 19, when the engagement portions 10 are disengaged, the heat-seal portion 521 and the sealant layer 401 are peeled by interfacial peeling, interlayer peeling, cohesion peeling, a combination of these or the like.

The easy-peel layer 52 including the heat-seal portion 521 is made of low density polyethylene (LDPE) such as linear low density polyethylene (LLDPE) or the like. To adjust peel strength of the easy-peel layer 52 including the heat-seal portion 521, polypropylene may be mixed to low density polyethylene (LDPE) or linear low density polyethylene (LLDPE). Examples of usable polypropylene include homopolypropylene, block polypropylene, random polypropylene (RPP), propylene-ethylene-butene-1 random ternary copolymer, and polyolefinic specialty soft resin (TPO resin).

The bond layer 51 that bonds the seal base 141 to the easy-peel layer 52 is made of a mixture of polypropylene and low density polyethylene, similarly to the male member 11 and the female member 12. Examples of usable polypropylene include homopolypropylene, block polypropylene, random polypropylene (RPP), propylene-ethylene-butene 1 random ternary copolymer, polyolefinic specialty soft resin (TPO resin) or the like or a mixture of these resins. Examples of usable low density polyethylene include linear low density polyethylene (LLDPE) and the like.

In the bond layer 51 and the easy-peel layer 52, a ratio of polypropylene in the easy-peel layer 52 preferably is less than a ratio of polypropylene in the bond layer 51. It is further preferable that the ratio of polypropylene in the easy-peel layer 52 is 0 to 70 wt. % and the ratio of polypropylene in the bond layer 51 is 40 to 80 wt. %.

The bond layer 51 and the easy-peel layer 52 may be formed as follows. For example, upon extrusion of the zipper tape 1, resins that form the bond layer 51 and the easy-peel layer 52 may undergo multilayer coextrusion so that the bond layer 51 and the easy-peel layer 52 are formed on the surface 141B of the seal base 141 on the belt-like base 14. For another example, the engagement portions 10 and the belt-like bases 13 and 14 may be extruded in advance. After the resins that form the bond layer 51 and the easy-peel layer 52 are liquidized, the liquidized coating material may be coated and dried on the surface 141B of the seal base 141 in side of the engagement portion 10 by a conventional coating method.

The zipper tape 1 possessing such an arrangement is fused on the base film 40 that forms the bag body 20. The base film 40 is made into a bag. Then, the zipper-equipped bag 30 as shown in FIG. 15 is obtained.

Here, the base film 40 which is a packaging material that forms the bag body 20 preferably is a laminated film formed by the sealant layer 401 on the base layer 402. However, depending on performances required, lamination of films such as a gas barrier layer, a light blocking layer, a strength improving layer, or the like (not shown) may be provided between the base layer 402 and the sealant layer 401 as an intermediate layer.

As shown in FIG. 18, when the product is taken out from the zipper-equipped bag 30 of the embodiment, the opening 24 is cut and the zipper tape 1 is opened to release the engagement of the engagement portion 10. The engagement having been released, the engagement portion 10 is not shown in the FIGS. 18 and 19. Subsequently, an opening force is applied to an upper portion (far from the product) of the bag body 20. The opening force causes the sealant layer 401 of the bag and the heat-seal portion 521 to be peeled from each other, as shown in FIG. 19.

The following effects can be obtained with the above zipper-equipped bag 30 in addition to the same functions and effects as those of the first embodiment.

(8-1) The heat-seal portion 521 bonded to the facing inner surface of the bag body in an easily peelable manner is provided on the surface of the seal base 141 in side of the engagement portions. The dimension between the heat seal portion 521 and the engagement portion 10 changes along a longitudinal direction of the belt-like base. Accordingly, the portion of the heat-seal portion 521 closest to the engagement portion 10 forms the stress concentration point when an unsealing procedure is conducted. Stress concentrates at the stress concentration point, which serves as a peeling starting point, thereby facilitating the peeling of the heat-seal portion 521.

(8-2) The heat-seal portion 521 is shaped including a plurality of arches whose tops are directed toward the opening of the bag. Accordingly, from whichever of a middle portion or an end portion of the opening of the bag unsealing is attempted, stress is concentrated to one of the tops of the arches (stress concentration points) when unsealing is conducted, leading the peeling to start therefrom. Therefore, the bag can be easily unsealed regardless of the unsealing position.

(8-3) The heat-seal portion 521 is shaped as a series of "mountains" (arches) and "valleys" (inverse arches), where the radius of curvature R1 of the mountains is smaller than the radius of curvature R2 of the valley, so that the stress is concentrated to the mountains which are closer to the opening. Therefore, peeling of the heat-seal portion 521 is facilitated.

(4) If the heat-seal portion 521 is formed of linear low density polyethylene, a greater peel strength is provided compared to the case in which normal low density polyethylene is employed. Accordingly, even when the heat-seal portion 521 is heat-fused on the inner surface of the bag body 20 made of a polypropylene film and the product is heat-processed in the retort process, the leakage of the product during the retort process due to peel of the heat-seal portion 521 can be prevented.

If the heat-seal portion 521 is formed not from the low density polyethylene but from, for example, a polypropylene adhesive, the peel strength between the inner surface of the bag body 20 and the heat-seal portion 521 is increased so much that the peeling may become difficult or impossible. However, since the heat-seal portion 521 of the embodiment includes the low density polyethylene, an adequate peel strength can be retained.

(8-5) The bond layer 51 is formed of a mixture of polypropylene and low density polyethylene, so that the bond layer 51 is made of the same material as the seal base 141 and the easy-peel layer 52. Therefore, bonding performance is improved.

Manufacturing Apparatus for Zipper-Equipped Bag

Next, a manufacturing apparatus for the zipper-equipped bag of the eighth embodiment according to the present invention will be described with reference to FIGS. 20 to 22.

The manufacturing apparatus for manufacturing the zipper-equipped bag 30 includes a bag-making portion. FIGS. 20 and 21 respectively show a principal portion of the bag-making portion.

Figure 20:
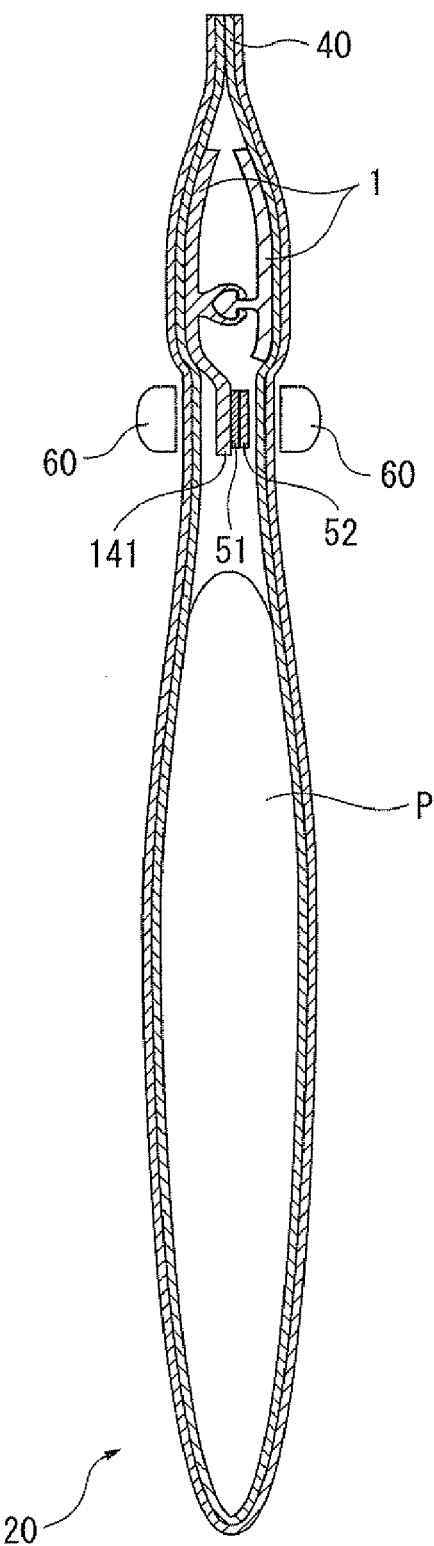
FIG. 20 is a cross-sectional view showing a principal portion of a manufacturing apparatus of the package bag having the zipper tape of the eighth embodiment.
Figure 21:
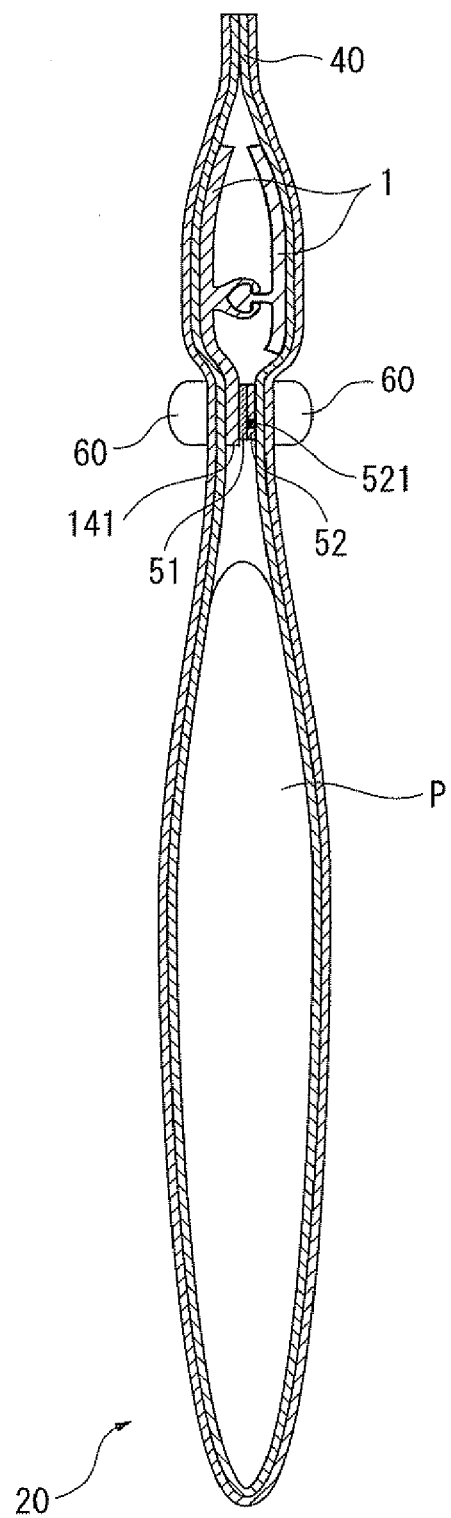
FIG. 21 is a cross-sectional view showing the manufacturing apparatus in operation making a heat-seal portion by a seal bar.

In FIGS. 20 and 21, the bag-making portion includes a taping portion (not shown) and an encapsulating portion. The taping portion includes a packaging material feeder (not shown), a tape feeder (not shown), and a tape attachment portion. The zipper tape 1 fed by the tape feeder is disposed between a pair of base films 40 fed by the packaging material feeder to have the zipper tape 1 attached to each of the pair of base films 40 by the tape attachment portion. In the encapsulating portion, the base films 40 having been conveyed thereto are fused to each other and melt-cut with a predetermined interval in a conveying direction of the base film 40, the interval being in correspondence with a widthwise dimension of the zipper-equipped bag 30.

The encapsulating portion includes a pair of seal bars 60 disposed opposing each other with the zipper-equipped bag 30 filled with a product P interposed therebetween while the zipper tape 1 of the zipper-equipped bag 30 is closed.

Each of the seal bars 60 is movable toward and away from each other. When the seal bars are separated from each other, the zipper-equipped bag 30 storing the product P is held at a predetermined position (see, FIG. 20). When the seal bars 60 are moved toward each other (see, FIG. 21) under the above circumstances, a first one of the seal bars 60 is pressed against the easy-peel layer 52 via the base film 40 to form the heat-seal portion 521 in the easy-peel layer 52.

Figure 22:
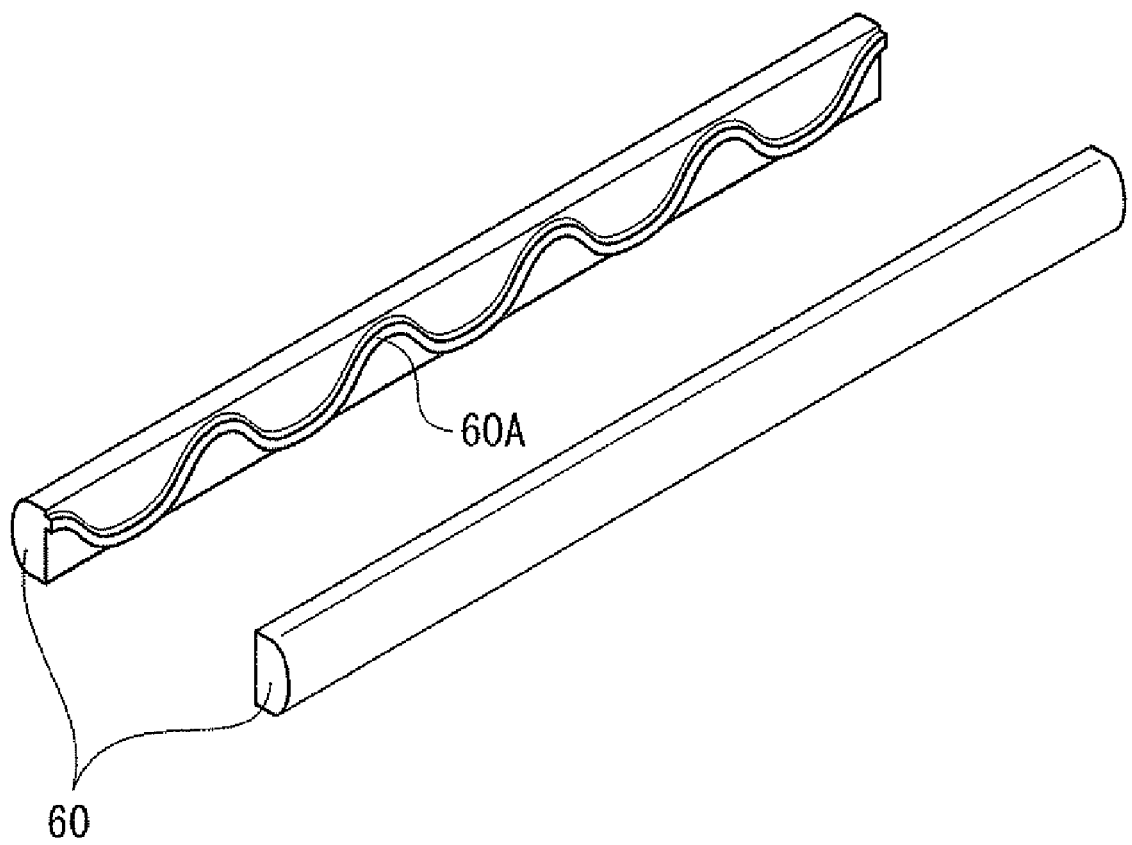
FIG. 22 is a perspective view showing the shape of the seal bar.

Here, as shown in FIG. 22, the first one of the seal bars 60 includes a pressing projection 60A, which is shaped as a series of arches similarly to the heat-seal portion 521.

In the embodiment, when the portion of the zipper tape 1 near the product is hermetically sealed, the seal bars 60 having the pressing projection 60A of the same shape as the heat-seal portion 521 are used. Accordingly, the heat-seal portion 521 yielded is easily peelable. Therefore, the zipper-equipped bag that can be easily peeled by the force that is applied to unseal the zipper tape can be manufactured.

Modifications of Embodiments

Note that the embodiments set forth above merely show embodiments of the present invention. The scope of the present invention is not limited to the above-described embodiments, and modifications and improvements are included in the present invention as far as the object(s) or effect(s) of the present invention are achieved. In addition, upon carrying out the present invention, the particular structures, shapes, and such may be modified, as far as the object(s) and effect(s) of the present invention.

Regarding the male member 11 and the female member 12 of the zipper tapes 1, 1B, 1C, 1D, 1E, 1F, and 1G in the above embodiment, the belt-like base 14 of the female member 12 is formed wider than the belt-like base 13 of the male member 11 in the above embodiments. However, the description is not limiting, but the belt-like base 13 of the male member 11 may be formed wider than the belt-like base 14 of the female member 12 to form the seal base on the belt-like base 13.

In the above embodiments, when the zipper tapes 1, 1B, 1C, 1D, 1E, 1F, and 1G are attached to the inner surface of the bag body 20, the belt-like bases 13 of the male member 11 and the belt-like base 14 of the female member 12 are heat-sealed directly on the inner surface (the sealant layer 401) of the bag body 20 (Note that such direct heat-sealing is not conducted on the surface 141A of the seal base 141 in the belt-like base 14 in opposite side of the engagement portions 10). However, the belt-like bases 13 and 14 of the male and female members 11 and 12 may be provided with, for example, seal layers formed of a resin that allows heat-sealing. Such seal layers improve attachment of the zipper tapes 1, 1B, 1C, 1D, 1E, 1F, and 1G to the bag body 20 (Note that the seal layer is not required to be provided on the surface 141A of the seal base 141 on the belt-like base 14 of the female member 12 in opposite side of the engagement portions 10).

In the above embodiments, opening and reclosing of the zipper tapes 1, 1B, 1C, 1D, 1E, 1F, and 1G are conducted as the substantially arrowhead-shaped head 16 of the male member 11 and the substantially arc-shaped first and second hooks 18 and 19 (the engagement portions 10) are disengaged and engaged. However, the shape of the engagement portion 10 is not limited thereto. The head 16 of the male member 11 and the first and second hooks 18 and 19 of the female member 12 may take any suitable shape and number as far as reclosing function is achieved.

Furthermore, the specific structures, shapes and such upon carrying out the present invention may be otherwise determined as far as an object of the present invention is achieved.

Figure 23:
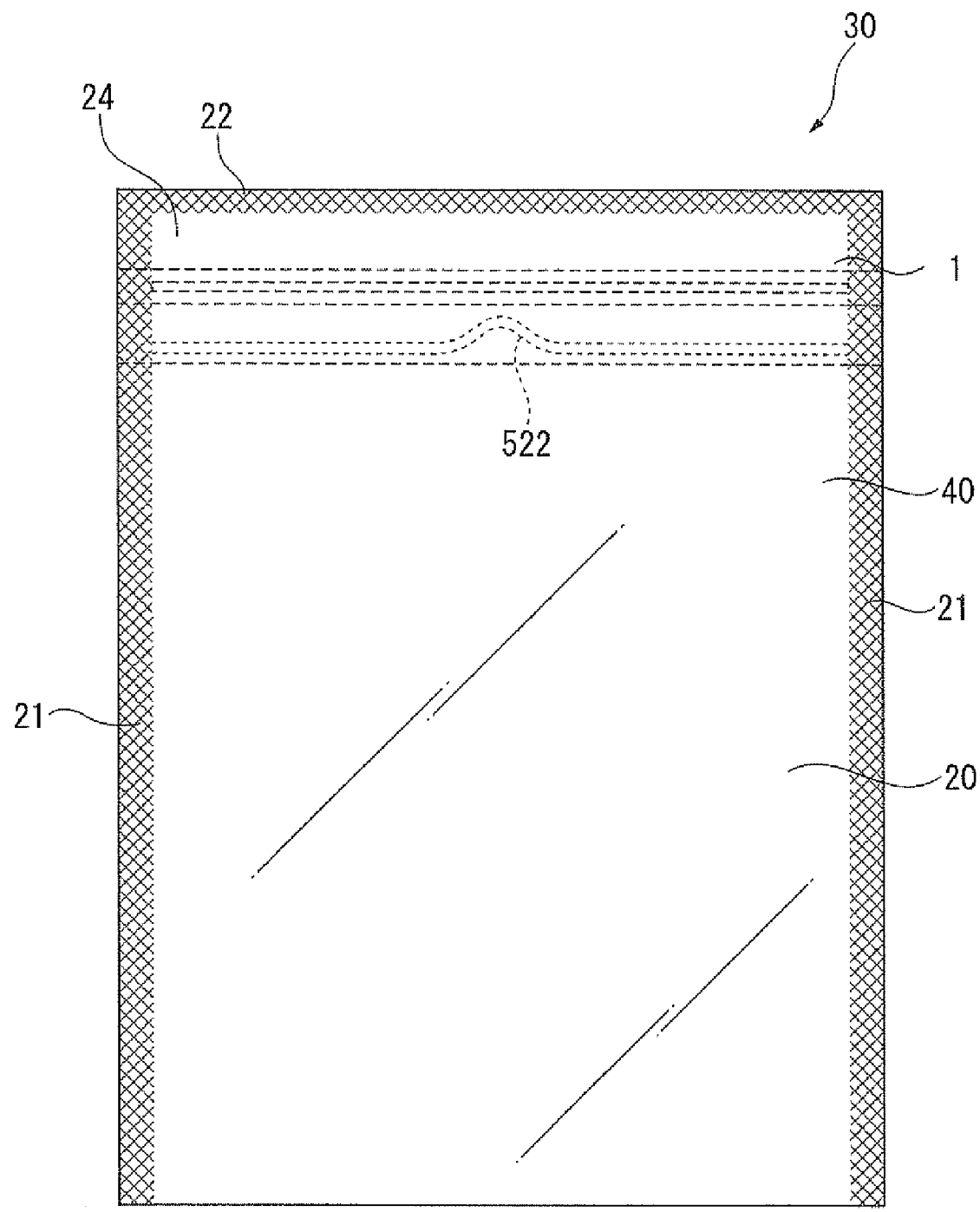
FIG. 23 is a front view showing a package bag having a zipper tape according to a modification of the present invention.

In the eighth embodiment, the heat-seal portion 521 is illustrated as a series of wave-shaped portions. As shown in FIG. 23, however, a heat-seal portion 522 including an arch having a top directed toward the opening 24 and linear portions continuing from both sides of the arch may be employed. The heat-seal portion 522 may also include two arches. Moreover, according to the present invention, the specific shapes of the heat-seal portions 521 and 522 are not limited thereto. As far as the stress concentration points are provided, any suitable shapes of the heat-seal portion and any number of the stress concentration points may be employed.

In the above embodiment of the manufacturing apparatus of the zipper-equipped bag, a surface of one of the seal bars includes the same shape as the heat-seal portion 521. However, surfaces of both of the seal bars may include the same shape as the heat-seal portion 521.

EXAMPLES

Examples and Comparative Examples will be set forth below for further specific description of the present invention, but the scope of the present invention is not limited by what will be shown of Examples and such.

Note that regarding the material characteristics of the resins in Examples and such, melt flow rate (MFR) was measured at 230° C. for polypropylene and 190° C. for polyethylene under a load of 21.1 N according to JIS (Japanese Industrial Standards) K7210, and the melting point was measured according to JIS K7121.

Examples 1 to 5, Comparative Examples 1 to 3

With regard to the first to seventh embodiments, Examples 1 to 5 and Comparative Examples 1 to 3 will be described.

Example 1

Figure 3:
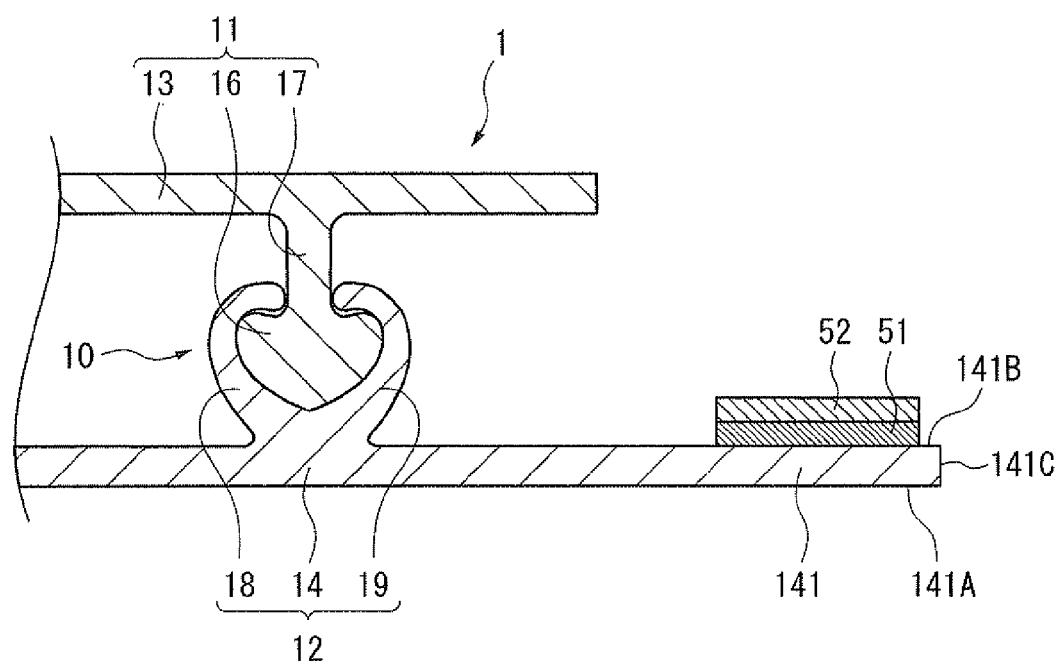
FIG. 3 is a cross-sectional view showing the zipper tape of the first embodiment.

In Example 1, the zipper tape 1 having the shape of the first embodiment shown in FIG. 3 was formed by extrusion with a commercially available extruding machine. The composition materials employed for the seal base 141, the bond layer 51, and the easy-peel layer 52 were as follows.

Seal base 141: TPO resin (MFR: 8.0 g/10 min, melting point 154° C.)

Bond layer 51: mixture of TPO resin (MFR: 8.0 g/10 min, melting point 154° C.) and linear low density polyethylene (MFR: 6.0 g/10 min, melting point 120° C.) TPO:LLDPE=60:40 (wt. %)

Easy-peel layer 52: low density polyethylene (MFR: 2.0 g/10 min, melting point/10 min, melting point 110° C.)

Example 2

In Example 2, the zipper tape 1 having the same arrangement as that of Example 1 except that the composition material of the easy-peel layer 52 was changed to linear low density polyethylene (MFR: 6.0 g/10 min, melting point 120° C.) was manufactured.

Example 3

In Example 3, the zipper tape 1B having the shape of the second embodiment shown in FIG. 6 was manufactured. The composition materials of the seal base 141, the bond layer 51, and the easy-peel layer 52 are the same as Example 2.

Example 4

Figure 9:
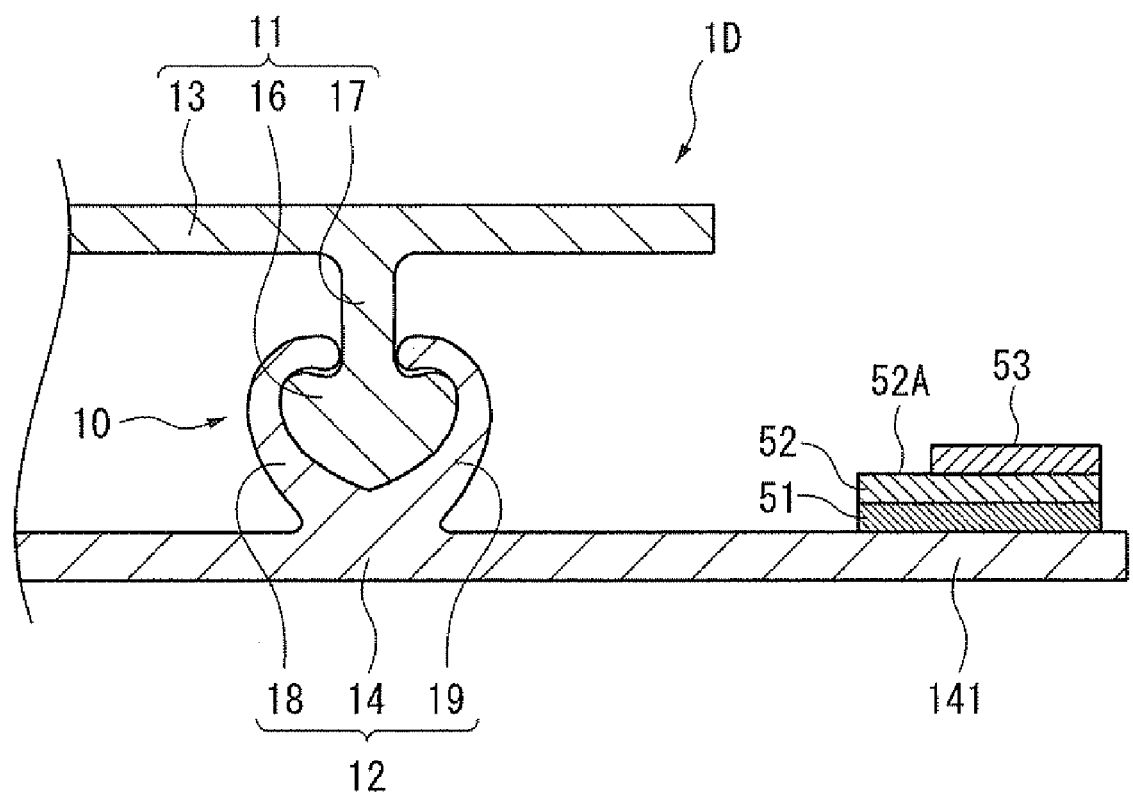
FIG. 9 is a cross-sectional view showing a zipper tape of a fourth embodiment.

In Example 4, the zipper tape 1D having the shape of the fourth embodiment shown in FIG. 9 was manufactured. The composition materials employed for the seal base 141, the easy-peel layer 52, and the seal layer 53 were as follows.

Seal base 141: TPO resin (MFR: 8.0 g/10 min, melting point 154° C.)

Bond layer 51: mixture of TPO resin (MFR: 8.0 g/10 min, melting point 154° C.) and linear low density polyethylene (MFR: 6.0 g/10 min, melting point 120° C.) TPO:LLDPE=60:40 (wt. %)

Easy peel layer 52: linear low density polyethylene (MFR: 6.0 g/10 min, melting point 120° C.)

Seal layer 53: TPO resin (MFR: 8.0 g/10 min, melting point 154° C.)

Example 5

Figure 12:
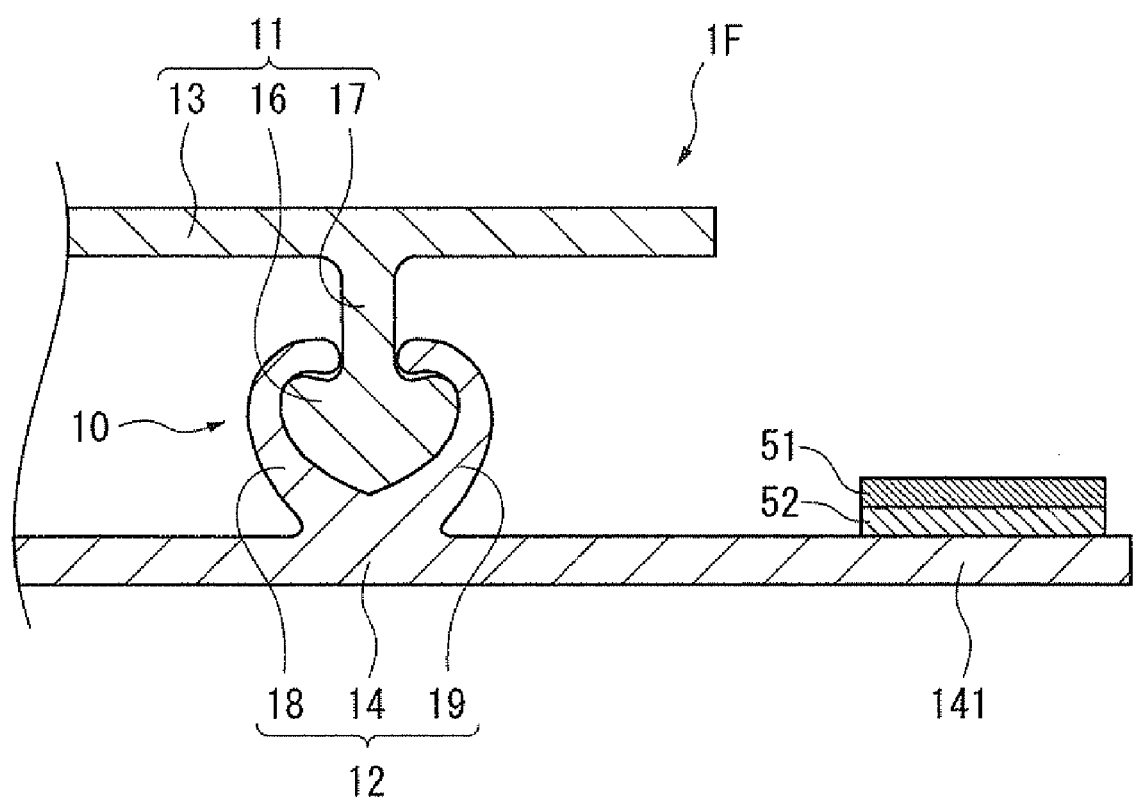
FIG. 12 is a cross-sectional view showing a zipper tape of a sixth embodiment.

In Example 5, the zipper tape 1F having the shape of the sixth embodiment shown in FIG. 12 was manufactured. The composition materials employed for the seal base 141, and the easy-peel layer 52 were as follows.

Seal base 141: TPO resin (MFR: 8.0 g/10 min, melting point 154° C.)

Bond layer 151: mixture of TPO resin (MFR: 8.0 g/10 min, melting point 154° C.) and linear low density polyethylene (MFR: 6.0 g/10 min, melting point 120° C.) TPO:LLDPE=60:40 (wt. %)

Easy-peel layer 52: linear low density polyethylene (MFR: 6.0 g/10 min, melting point 110° C.)

Comparative Example 1

Comparative Example 1 differed from Example 1 in that the bond layer 51 was not provided and the easy-peel layer 52 was layered directly on the seal base 141. The composition materials of the seal base 141 and the easy-peel layer 52 were the same as those of Example 1.

Comparative Example 2

Comparative Example 2 differed from Example 1 only in that the mixture ratio in the easy-peel layer 52 was changed to TPO:LLDPE=30:70 (wt. %).

Comparative Example 3

Comparative Example 3 differed from Comparative Example 1 only in that the easy-peel layer 52 was formed of PP (polypropylene) adhesive ADMER (registered trademark) QF551 manufactured by Mitsui Chemicals, Inc.

Test Examples

Regarding Examples 1 to 3 and Comparative Examples 1 to 3, the zipper tape was heat-fused respectively on a first film and a second film of a pair of the following film (the inner surface of the bag body 20), and the surface 52A of the easy-peel layer 52 of the zipper tape was heat-fused on the second film (the inner surface of the bag body 20). At this time, the easy-peel layer 52 was heat-fused on the film, the fused portion having the smaller width W2 than the width W1 of the easy-peel layer 52 similarly to the second embodiment, so that the portion of the surface 52A of the easy-peel layer 52 near the unsealing side (portion near the engagement portions 10) is not heat-fused on the film. The package bag was manufactured in a manner that the surface 141A of the seal base 141 in opposite side of the engagement portion is not appreciably bonded to the facing inner surface of the bag body 20.

In Examples 4 and 5, films mentioned below were employed. The zipper tape was heat-fused respectively on the first film and the second film. The entire surface of the easy peel layer 52 of the zipper tape was heat-fused on the second film. The package bag was manufactured in a manner that the surface 141A of the seal base 141 in opposite side of the engagement portion was not appreciably bonded to the facing inner surface of the bag body 20.

Note that in all the cases the sealing condition of the easy-peel layer 52 was set at 180° C.

Employed as the film of the package bag was a laminated film consisting of biaxially oriented polyethylene terephthalate film (12 μm thick)/a biaxially oriented nylon film (15 μm thick)/a cast polypropylene film (70 μm thick).

The above package bag was tested to compare and evaluate between peeling feels of the easy-peel layer 52 before and after the following retort process and between stabilities of the peel start point before and after the following retort process. The retort process was conducted under the conditions of 135° C., 30 minutes, and a constant-pressure method (0.2 MPa), with cooking oil encapsulated in the package bag.

Note that the following signs and remarks are used as the evaluation standard of the peeling feel and the evaluation standard of the stability of the peel start point.

Evaluation Standard of Peeling Feel

A: Peelable at an appropriate peel strength, and little change in the peel strength before and after the retort process.

B: B: Peelable at an appropriate strength, but the peel strength reduced to about 70% after the retort process.

C: Peelable at an appropriate strength, but the peel strength reduced to about 50% after the retort process.

D: Hardly peelable or unpeelable due to a great peel strength.

Evaluation Standard of Stability of Peeling Position

A: Peeled always at the same point upon unsealing.

B: Peeled at various points upon unsealing.

TABLE 1

|  | Peeling Feel | Stability of Peel Start Point |
| --- | --- | --- |
| Example 1 | C | A |
| Example 2 | B | A |
| Example 3 | A | A |
| Example 4 | B | A |
| Example 5 | B | A |
| Comparative Example 1 | C | B |
| Comparative Example 2 | C | B |
| Comparative Example 3 | D | — |

It is known from the results shown in Table 1 that peelability at an appropriate strength was confirmed in Examples 1 to 5. Especially in Example 3, where the bond layer 51 was set at the same height position as that of the surface 52A of the easy-peel layer 52, the peel strength was barely changed before and after the retort process. It was therefore confirmed that if the bond layer 51 was provided so that the product does not reach the bonded portion of the easy-peel layer 52, decrease in the strength of the easy-peel layer 52 by the oil product and such can be effectively prevented.

Furthermore, whereas Comparative Examples 1 to 3 exhibited instability in the peel start point or difficulty in the peeling itself, all of Examples 1 to 5 showed a constant peel start point. It was thus confirmed that the peel start points are stabilized by forming the bond layer 51.

Examples 6 to 11, Comparative Examples 4 to 6

Next, with regards to the eighth embodiment, Examples 6 to 11 and Comparative Examples 4 to 6 will be described.

The following tests were conducted to see relationship between the difference in the shapes of the heat-seal portion 521 and the effects of the invention.

Example 6

In Example 6, the zipper tape 1 of the eighth embodiment was formed by extrusion with a commercially available extruding machine. The composition materials employed for the seal base 141, the bond layer 51, and the easy-peel layer 52 including the heat-seal portion 521 were as follows. The pressing projection 60A of the seal bar 60 was shaped as a series of wave-shaped portions ("mountains" and "valleys") (see, FIG. 15).

Seal base 141: TPO resin (MFR: 8.0 g/10 min, melting point 154° C.)

Bond layer 151: mixture of TPO resin (MFR: 8.0 g/10 min, melting point 154° C.) and linear low density polyethylene (MFR: 6.0 g/10 min, melting point 120° C.) TPO: linear low density polyethylene=60:40 (wt. %)

Easy-peel layer 52: linear low density polyethylene (MFR: 6.0 g/10 min, melting point 120° C.)

Base film 40: a laminated film consisting of polyethylene terephthalate (PET) (12 μm thick)/nylon (Ny) (15 μm thick)/cast polypropylene film (CPP) (60 μm thick)

Example 7

Example 7 was the same as Example 6 except that the pressing projection 60A of the seal bar 60 was shaped having two wave-shaped portions in the middle.

Example 8

Example 8 was the same as Example 6 except that the pressing projection 60A of the seal bar 60 was shaped having one wave-shaped portion in the middle (see, FIG. 23).

Example 9

In Example 9, the zipper tape 1 of the eighth embodiment was formed by extrusion with a commercially available extruding machine. The composition materials employed for the seal base 141, the bond layer 51, and the easy-peal portion 52 including the heat-seal portion 521 were as follows. The pressing projection 60A of the seal bar 50 was shaped as a series of wave-shaped portions ("mountains" and "valleys").

Seal base 141: TPO resin (MFR: 8.0 g/10 min, melting point 154° C.)

Bond layer 151: mixture of TPO resin (MFR: 8.0 g/10 min, melting point 154° C.) and linear low density polyethylene (MFR: 6.0 g/10 min, melting point 120° C.) TPO: Linear low density polyethylene=80:20 (wt. %)

Easy peel layer 52: mixture of TPO resin (MFR: 8.0 g/10 min, melting point 154° C.) and linear low density polyethylene (MFR: 6.0 g/10 min, melting point 120° C.) TPO: Linear low density polyethylene=70:30 (wt. %)

Base film 40: a laminated film consisting of polyethylene terephthalate (PET) (12 µm thick)/nylon (Ny) (15 µm thick)/cast polypropylene film (CPP) (60 µm thick)

Example 10

Example 10 was the same as Example 9 except that the pressing projection 60A of the seal bar 60 was shaped having two wave-shaped portions in the middle.

Example 11

Example 11 was the same as Example 9 except that the pressing projection 60A of the seal bar 60 was shaped having one wave-shaped portion in the middle.

Comparative Example 4

Comparative Example 4 differed from Example 6 only in that the pressing projection 60A of the seal bar 60 was formed linear.

Comparative Example 5

Comparative Example 5 differed from Example 9 only in that the pressing projection 60A of the seal bar 60 was formed linear.

Comparative Example 6

In Example 6, the zipper tape disclosed in Patent Document 1 not having the belt-like base formed wider than the other was sealed in a sealing fashion disclosed in Patent Document 3.

Evaluation Standard of Unsealing Performance after Seal Process

In Examples 6 to 11 and Comparative Examples 4 to 6, sealing temperature of the heat-seal portion 521 was 180° C. In Examples 6 to 11 and Comparative Example 4, peel strength in the case of the linear heat-seal portion was adjusted to be 20 N/15 mm using a three-side-seal bag-making machine, and a bag-making procedure was conducted under the same condition using the seal bar 60 having the pressing projection 60A with plural "mountains" (see, FIG. 22). The bag had a width of 200 mm and a height of 200 mm.

Note that the following sign and remarks are used as the evaluation standard of the unsealing performance after the seal process.

A: easily peelable
B: somewhat resistant, but peelable
C: difficult to unseal due to great resistance Evaluation Standard of Pressure Resistance The bag was filled with 200 ml of water to prepare a sample. 100 Kg of load was applied on the sample, and the sample was left for one minute to examine if the weak seal portion (heat-seal portion) would be peeled or not.

Note that the following sign and remarks are used as the evaluation standard of the pressure resistance after the seal process.

A: peeled
B: not peeled

Drop Impact

The bag was filled with 200 ml of water to prepare the sample. The sample was dropped from a height of 1 m to examine if the weak seal portion (heat-seal portion) would be peeled or not.

Note that the following sign and remarks are used as the evaluation standard of the drop impact.

A: peeled
B: not peeled

The test results are shown in Table 2.

TABLE 2

|  | Unsealing Performance | Pressure Resistance | Drop Impact |
| --- | --- | --- | --- |
| Example 6 | A | A | A |
| Example 7 | A | A | A |
| Example 8 | B | A | A |
| Example 9 | A | A | A |
| Example 10 | A | A | A |
| Example 11 | B | A | A |
| Comparative Example 4 | C | A | A |
| Comparative Example 5 | C | A | A |
| Comparative Example 6 | A | B | B |

It is known from Table 2 that Examples 6 to 11 as a whole exhibited good unsealing performance, pressure resistance, and drop impact. Example 8 and Example 11 exhibited some resistance in the unsealing performance since the heat-seal portion was shaped to include only a small number of the stress concentration points that form the peeling starting portion. However, this does not constitute a practical problem.

In Comparative Examples 4 and 5, since the linear seal bar was employed, unsealing was difficult. It is known that in Comparative Example 6, the peel strength of the seal portion was weak, so that the hermetic performance was not retained against external pressure.

Increase in a composition ratio of polypropylene in the easy peel layer 52 normally causes increase in peel strength, so that unsealing is hindered in the case of a linearly shaped heat-seal portion. However, by including (a) wave-shaped portion(s) (mountains and valleys) in the shape of the heat-seal portion, unsealing is facilitated, even when more polypropylene than linear low density polyethylene is contained in the easy-peel layer 52.

The invention claimed is:
1. A zipper tape, comprising:
a male member including a first engagement portion and a first belt-like base continued to the first engagement portion and a female member including a second engagement portion and a second belt-like base continued to the second engagement portion, the first and the second engagement portions mating in a pair, wherein
one of the first and the second belt-like bases is widened from the mating first and second engagement portions to a crosswise end of the one of the first and the second belt-like bases relative to the other of the first and the second belt-like bases in order to define a seal base,
a bond layer and an easy-peel layer bonded to the seal base via the bond layer are layered on a first surface of the seal base in side of the mating first and second engagement portions,
the seal base is formed of polypropylene,
the bond layer is formed of a mixture of polypropylene and low density polyethylene,
the easy-peel layer is formed of a mixture of low density polyethylene and polypropylene, and
a ratio of polypropylene in the easy-peel layer is less than a ratio of polypropylene in the bond layer.
2. The zipper tape according to claim 1, wherein
the easy-peel layer is formed of a mixture of linear low density polyethylene and polypropylene.

3. The zipper tape according to claim 1, wherein
the bond layer is formed of a mixture of polypropylene and linear low density polyethylene, and a ratio of the polypropylene therein is 40 to 80 wt. %.

4. The zipper tape according to claim 1, wherein
the bond layer comprises an extended portion extending to a crosswise end of the seal base relative to the easy-peel layer, and
the extended portion is leveled with a first surface of the easy-peel layer.

5. A zipper tape, comprising:
a male member including a first engagement portion and a first belt-like base continued to the first engagement portion and a female member including a second engagement portion and a second belt-like base continued to the second engagement portion, the first and the second engagement portions mating in a pair, wherein
one of the first and the second belt-like bases is widened from the mating first and second engagement portions to a crosswise end of the one of the first and the second belt-like bases relative to the other of the first and the second belt-like bases in order to define a seal base,
a bond layer, an easy-peel layer bonded to the seal base via the bond layer, and a seal layer provided on a first surface of the easy-peel layer are layered on a first surface of the seal base in side of the mating first and second engagement portions,
the seal base is formed of polypropylene,
the bond layer is formed of a mixture of polypropylene and low density polyethylene,
the easy-peel layer is formed of low density polyethylene, and the seal layer is formed of polypropylene.

6. The zipper tape according to claim 5, wherein
the easy-peel layer is formed of linear low density polyethylene.

7. The zipper tape according to claim 5, wherein
the bond layer is formed of a mixture of polypropylene and linear low density polyethylene, and a ratio of the polypropylene therein is 40 to 80 wt. %.

8. The zipper tape according to claim 5, wherein
an end of the seal layer adjacent to the mating first and second engagement portions is disposed farther from the engaged portions than the end of the easy-peel layer adjacent to the engagement portions so that a portion of the first surface of the easy-peel layer adjacent to the mating first and second engagement portions is not covered by the seal layer.

9. The zipper tape according to claim 5, wherein
the bond layer comprises an extended portion extending to a crosswise end of the seal base relative to the easy-peel layer, and
the extended portion is leveled with the first surface of the easy-peel layer.

10. A zipper tape, comprising:
a male member including a first engagement portion and a first belt-like base continued to the first engagement portion and a female member including a second engagement portion and a second belt-like base continued to the second engagement portion, the first and the second engagement portions mating in a pair, wherein
one of the first and the second belt-like bases is widened from the mating first and second engagement portions to a crosswise end of the one of the first and the second belt-like bases relative to the other of the first and the second belt-like bases in order to define a seal base,
an easy-peel layer and a bond layer provided on a surface of the easy-peel layer are layered on a surface of the seal base in side of the mating first and second engagement portion,
the seal base is formed of polypropylene,
the bond layer is formed of a mixture of polypropylene and low density polyethylene,
the easy-peel layer is formed of a mixture of low density polyethylene and polypropylene, and
a ratio of polypropylene in the easy-peel layer is less than a ratio of polypropylene in the bond layer.

11. The zipper tape according to claim 10, wherein
the easy-peel layer is formed of a mixture of linear low density polyethylene and polypropylene.

12. The zipper tape according to claim 10, wherein
the bond layer is formed of a mixture of polypropylene and linear low density polyethylene, and a ratio of the polypropylene therein is 40 to 80 wt. %.

13. The zipper tape according to claim 10, wherein
the bond layer includes an extended portion extending to a crosswise end of the seal base relative to the easy-peel layer and
the extended portion is bonded to the seal base.

14. A package bag having a zipper tape, the package bag being formed of plastic films, the package bag comprising:
the zipper tape according to claim 1, wherein
the zipper tape is heat-fused to each of opposing inner surfaces of the plastic films in an attitude such that the seal base is adjacent to the product-residing side relative to the mating first and second engagement portions,
a first surface in side of the mating first and second engagement portions of the seal base on which the easy-peel layer is layered is heat-fused to a first of the inner surfaces of the plastic films via the easy-peel layer or via the easy-peel layer and the bond layer, and
a second surface in opposite side of the mating first and second engagement portions of the seal base on which the easy-peel layer is layered is not appreciably bonded to a second of the inner surfaces of the films that faces the second surface of the seal base.

15. A package bag having a zipper tape, the package bag being formed of plastic films, the package bag comprising:
the zipper tape according to claim 1, wherein
the zipper tape is heat-fused to each of opposing inner surfaces of the plastic films in an attitude such that the seal base is adjacent to the product-residing side relative to the mating first and second engagement portions,
the first surface in side of the mating first and second engagement portions of the seal base on which the easy-peel layer is layered is heat-fused to the first of the inner surfaces of the plastic films via the easy-peel layer or via the easy-peel layer and the bond layer while a portion of the surface of the easy-peel layer adjacent to the mating first and second engagement portions is not heat-fused to the first of the inner surfaces of the films,
a second surface in opposite side of the mating first and second engagement portions of the seal base on which the easy-peel layer is layered is not appreciably bonded to a second of the inner surfaces of the films that faces the second surface of the seal base.

16. A package bag having a zipper tape, the package bag being formed of plastic films, the package bag comprising:
the zipper tape according to claim 5, wherein
the zipper tape is heat-fused to each of opposing inner surfaces of the plastic films in an attitude such that the seal base is adjacent to the product-residing side relative to the mating first and second engagement portions, the first surface in side of the mating first and second engagement portions of the seal base on which the easy-peel layer is layered is heat-fused to a first of the inner surfaces of the plastic films via the seal layer, and a second surface in opposite side of the engagement portions of the seal base on which the easy-peel layer is layered is not appreciably bonded to a second of the inner surfaces of the films that faces the second surface of the seal base.

17. A package bag having a zipper tape, the package bag being formed of plastic films, the package bag comprising:
the zipper tape according to claim 10, wherein
the zipper tape is heat-fused to each of opposing inner surfaces of the plastic films in an attitude such that the seal base is adjacent to the product-residing side relative to the mating first and second engagement portions,
a first surface of the seal base on which the easy-peel layer is layered in side of the mating first and second engagement portions is heat-fused to a first of the inner surfaces of the plastic films via the bond layer, and
a second surface in opposite side of the mating first and second engagement portions of the seal base on which the easy-peel layer is layered is not appreciably bonded to a second of the inner surfaces of the films that faces the second surface of the seal base.

18. A package bag having a zipper tape, comprising:
the zipper tape attached to an inner surface of the package bag according to claim 1, wherein
the zipper tape comprises a male member including a first engagement portion and a first belt-like base continued to the first engagement portion and a female member including a second engagement portion and a second belt-like base continued to the second engagement portion, the first and the second engagement portions mating in a pair, wherein
a heat-seal portion shaped such that a dimension between the heat-seal portion and the mating male and female engagement portions changes along a longitudinal direction of the one of the first and second belt-like bases and bonded to a facing inner surface of a bag body in an easily peelable manner is provided to the first surface of the seal base in side of the mating first and second engagement portions, and
a second surface in opposite side of the engagement portions of the seal base on which the easy-peel layer is layered is not appreciably bonded to another inner surface of the bag body that corresponds to the second surface of the seal base.

19. A package bag having a zipper tape, comprising:
the zipper tape attached to an inner surface of the package bag according to claim 5, wherein
the zipper tape comprises a male member including a first engagement portion and a first belt-like base continued to the first engagement portion and a female member including a second engagement portion and a second belt-like base continued to the second engagement portion, the first and the second engagement portions mating in a pair, wherein
a heat-seal portion shaped such that a dimension between the heat-seal portion and the mating male and female engagement portions changes along a longitudinal direction of the one of the first and second belt-like bases and bonded to a facing inner surface of a bag body in an easily peelable manner is provided to the first surface of the seal base in side of the mating first and second engagement portions, and
a second surface in opposite side of the engagement portions of the seal base on which the easy-peel layer is layered is not appreciably bonded to another inner surface of the bag body that corresponds to the second surface of the seal base.

20. A package bag having a zipper tape, comprising:
the zipper tape attached to an inner surface of the package bag according to claim 10, wherein
the zipper tape comprises a male member including a first engagement portion and a first belt-like base continued to the first engagement portion and a female member including a second engagement portion and a second belt-like base continued to the second engagement portion, the first and the second engagement portions mating in a pair, wherein
a heat-seal portion shaped such that a dimension between the heat-seal portion and the mating male and female engagement portions changes along a longitudinal direction of the one of the first and second belt-like bases and bonded to a facing inner surface of a bag body in an easily peelable manner is provided to the first surface of the seal base in side of the mating first and second engagement portions, and
a second surface in opposite side of the engagement portions of the seal base on which the easy-peel layer is layered is not appreciably bonded to another inner surface of the bag body that corresponds to the second surface of the seal base.

21. The package bag having the zipper tape according to claim 18, wherein the heat-seal portion is shaped to include at least one wave-shaped portion.

22. The package bag having the zipper tape according to claim 19, wherein the heat-seal portion is shaped to include at least one wave-shaped portion.

23. The package bag having the zipper tape according to claim 20, wherein the heat-seal portion is shaped to include at least one wave-shaped portion.

24. The package bag having the zipper tape according to claim 18, wherein the heat-seal portion is shaped to include two or more wave-shaped portions.

25. The package bag having the zipper tape according to claim 19, wherein the heat-seal portion is shaped to include two or more wave-shaped portions.

26. The package bag having the zipper tape according to claim 20, wherein the heat-seal portion is shaped to include two or more wave-shaped portions.

27. The package bag having the zipper tape according to claim 18, wherein the heat-seal portion is shaped in such manner that radius of curvature of the arch-shaped portion projecting toward an opening of the package bag is smaller than radius of curvature of the wave-shaped portion projecting toward the product-residing side.

28. The package bag having the zipper tape according to claim 19, wherein the heat-seal portion is shaped in such manner that radius of curvature of the arch-shaped portion projecting toward an opening of the package bag is smaller than radius of curvature of the arch-shaped portion projecting toward the product-residing side.

29. The package bag having the zipper tape according to claim 20, wherein the heat-seal portion is shaped in such manner that radius of curvature of the arch-shaped portion projecting toward an opening of the package bag is smaller than radius of curvature of the arch-shaped portion projecting toward the product-residing side.

30. The package bag having the zipper tape according to claim 27, wherein the heat-seal portion has a substantially uniform width.

31. The package bag having the zipper tape according to claim 28, wherein the heat-seal portion has a substantially uniform width.

32. The package bag having the zipper tape according to claim 29, wherein the heat-seal portion has a substantially uniform width.

33. A manufacturing apparatus that manufactures the package bag having the zipper tape according to claim 18, comprising:
- a pair of seal bars disposed opposing each other with the package bag having the zipper tape interposed therebetween, wherein
- at least one of the pair of seal bars includes the heat-seal portion.

34. A manufacturing apparatus that manufactures the package bag having the zipper tape according to claim 19, comprising:
- a pair of seal bars disposed opposing each other with the package bag having the zipper tape interposed therebetween, wherein
- at least one of the pair of seal bars includes the heat-seal portion.

35. A manufacturing apparatus that manufactures the package bag having the zipper tape according to claim 20, comprising:
- a pair of seal bars disposed opposing each other with the package bag having the zipper tape interposed therebetween, wherein
- at least one of the pair of seal bars includes the heat-seal portion.

* * * * *